(12) United States Patent
Bain et al.

(10) Patent No.: US 10,710,914 B2
(45) Date of Patent: *Jul. 14, 2020

(54) OXIDATION PROCESS

(71) Applicant: Great Lakes Clean Water Limited Partnership, Mississauga (CA)

(72) Inventors: Thomas W. Bain, Mississauga (CA); David Fancher, Dayton, OH (US)

(73) Assignee: Great Lakes Clean Water Limited Partnership, Mississauga (CA)

( * ) Notice: Subject to any disclaimer, the term of this patent is extended or adjusted under 35 U.S.C. 154(b) by 288 days.

This patent is subject to a terminal disclaimer.

(21) Appl. No.: 15/640,078

(22) Filed: Jun. 30, 2017

(65) Prior Publication Data

US 2017/0297935 A1 Oct. 19, 2017
US 2019/0367392 A9 Dec. 5, 2019

Related U.S. Application Data

(63) Continuation of application No. 13/619,243, filed on Sep. 14, 2012, now abandoned, which is a
(Continued)

(51) Int. Cl.
  *C02F 1/20* (2006.01)
  *C02F 1/78* (2006.01)
  *C02F 103/00* (2006.01)

(52) U.S. Cl.
  CPC ............. *C02F 1/78* (2013.01); *C02F 1/20* (2013.01); *C02F 2103/002* (2013.01);
  (Continued)

(58) Field of Classification Search
  CPC ........ C02F 1/20; C02F 1/78; C02F 2103/002; C02F 2103/003; C02F 2103/005;
  (Continued)

(56) References Cited

U.S. PATENT DOCUMENTS 2,606,150 A  8/1952  Thorp et al.
3,674,216 A  7/1972  Blair
(Continued)

OTHER PUBLICATIONS

"Flash Reactor Performance," Mazzei Injector Company website, accessed Jul. 7, 2009, (http://www.mazzei.net/products/flash_reactor_performance.html) 2 pages.
(Continued)

*Primary Examiner* — Lucas A Stelling
(74) *Attorney, Agent, or Firm* — Bereskin & Parr LLP/S.E.N.C.R.L., S.R.L.

(57) ABSTRACT

A batch process for the treatment of an aqueous solution so that the treated product is more desirable for disposal includes obtaining an influent batch of aqueous solution for treatment, treating the batch of solution by an advanced oxidation process. The advanced oxidation process including causing ozone to be mixed with the solution, maintaining the mixture of solution and ozone at a pressure above atmospheric for a time of at least two seconds. An embodiment of the process includes continuously recirculating the fluid to be treated, through a recirculation conduit, the recirculation conduit including an ozone injector and the ozone injector is adapted to inject ozone into the aqueous solution as the aqueous solution circulates through an ozone injector. Influent to be treated may be selected from the group including sewage, septage, leachate, ballast or other aqueous solutions where it is desirable to treat the fluid prior to disposal, further treatment, or reuse. The process is carried out to improve a level of disinfection and/or denutrification of the effluent. The process may include back-to-back processing of batches one after the other, more or less continuously. The process may include overlapping processing, in which part of a treated previous batch is retained to mix with an incoming untreated batch. The process may include off-gassing between stages of adding ozone, and the
(Continued)

process may involve repetitive high pressure and low pressure cycles. The process may include post processing steps, such as permitting at least a portion of a treated batch to be retained without the addition of ozone for a period of time to permit floculates longer to form. The process may include post process filtering, which may be single or multi-stage filtering, such as may allow for the removal of floculates. The process may include simultaneous post-processing of part or all of one batch while another batch is being processed. The process may include the treatment of solutions containing pharmaceuticals to break down the pharmaceuticals.

30 Claims, 13 Drawing Sheets

Related U.S. Application Data continuation-in-part of application No. 12/219,186, filed on Jul. 17, 2008, now Pat. No. 8,449,777.

(60) Provisional application No. 61/535,483, filed on Sep. 16, 2011, provisional application No. 60/935,128, filed on Jul. 26, 2007.

(52) U.S. Cl.
CPC .. *C02F 2103/003* (2013.01); *C02F 2103/005* (2013.01); *C02F 2103/008* (2013.01); *C02F 2209/04* (2013.01); *C02F 2301/046* (2013.01); *C02F 2303/04* (2013.01)

(58) Field of Classification Search
CPC ............ C02F 2103/008; C02F 2209/04; C02F 2301/046; C02F 2303/04
See application file for complete search history.

(56) References Cited

U.S. PATENT DOCUMENTS

| | | | |
|---|---|---|---|
| 3,730,466 A | 5/1973 | Swanquist | |
| 4,255,257 A | 3/1981 | Greiner et al. | |
| 4,555,335 A | 11/1985 | Burris | |
| 4,661,264 A | 4/1987 | Goudy, Jr. | |
| 4,689,154 A | 8/1987 | Zimberg | |
| 4,816,145 A | 3/1989 | Goudy, Jr. | |
| 5,043,079 A | 8/1991 | Hallett | |
| 5,075,016 A | 12/1991 | Barnes | |
| 5,160,606 A | 11/1992 | De Simone et al. | |
| 5,186,841 A | 2/1993 | Schick | |
| 5,302,288 A | 4/1994 | Meidl et al. | |
| 5,348,664 A | 9/1994 | Kim et al. | |
| 5,409,616 A | 4/1995 | Garbutt et al. | |
| 5,427,693 A | 6/1995 | Mausgrover et al. | |
| 5,493,743 A | 2/1996 | Schneider et al. | |
| 5,498,330 A | 3/1996 | Delle Cave | |
| 5,656,246 A * | 8/1997 | Patapoff | A61L 2/202 422/110 |
| 5,683,576 A | 11/1997 | Olsen | |
| 5,851,407 A | 12/1998 | Bowman et al. | |
| 5,868,945 A * | 2/1999 | Morrow | C02F 1/722 210/760 |
| 6,013,189 A | 1/2000 | Burris | |
| 6,024,882 A | 2/2000 | McNeilly et al. | |
| 6,039,884 A | 3/2000 | Burris et al. | |
| 6,068,778 A | 5/2000 | Steiner et al. | |
| 6,146,524 A | 11/2000 | Story | |
| 6,153,111 A | 11/2000 | Conrad et al. | |
| 6,235,207 B1 | 5/2001 | Conrad | |
| 6,402,945 B1 | 6/2002 | Swales et al. | |
| 6,669,838 B1 | 12/2003 | Baarman | |
| 6,673,251 B2 | 1/2004 | Swales et al. | |
| 6,730,214 B2 | 5/2004 | Mazzei | |
| 6,783,679 B1 | 8/2004 | Rozich | |
| 6,821,443 B2 | 11/2004 | Kim | |
| 7,264,419 B2 | 9/2007 | Bowman et al. | |
| 8,449,777 B2 | 5/2013 | Bain et al. | |
| 2002/0175128 A1 | 11/2002 | Swales et al. | |
| 2003/0226803 A1* | 12/2003 | Kamiya | C02F 9/00 210/603 |
| 2003/0234225 A1* | 12/2003 | Brunsell | C02F 1/78 210/760 |
| 2004/0168989 A1* | 9/2004 | Tempest, Jr. | C02F 1/78 210/760 |
| 2005/0145575 A1 | 7/2005 | Yasunaga et al. | |
| 2006/0021634 A1* | 2/2006 | Liu | B01F 3/04503 134/1.3 |
| 2009/0026147 A1 | 1/2009 | Bain et al. | |
| 2009/0050572 A1 | 2/2009 | McGuire et al. | |
| 2009/0230059 A1 | 9/2009 | McGuire et al. | |
| 2010/0193977 A1* | 8/2010 | Yamamoto | B01F 3/04503 261/151 |
| 2010/0219137 A1* | 9/2010 | Lacasse | B01D 61/145 210/750 |

OTHER PUBLICATIONS

"Pipeline Flash Reactor" Mazzei Injector Company website, accessed Jul. 7, 2009, (http://www.mazzei.net/products/pipeline_flash_reactor.html) 2 pages.
Google search results for "mazzei FR-75-X", accessed Jul. 6, 2009, 2 pages.
Paper Entitled "Inactivation of Giardia and Cryptosporidium Using Ozone" by G.R. Finch and E.K. Black, Environmental Engineering and Science Program, Department of Civil Engineering, University of Alberta, Edmonton, Alberta Canada T6G 2G7 (1993), 17 pages.
Paper Entitled "Inactivation of Giardia Muris Using Ozone and Ozone-Hydrogen Peroxide" by C.W. Labatiuk and G.R. Finch, Environmental Engineering and Science Program, Department of Civil Engineering, University of Alberta, Edmonton, Alberta, Canada T6G 2G7 (1994), 12 pages.
Article entitled "Comparison of Giardia lamblia and Giardia muris Cyst Inactivation by Ozone" by G.R. Finch, E.K. Black, C.W. Labatiuk, L. Gyurek and M. Belosevic, University of Alberta, published Applied and Environmental Microbiology (Nov. 1993) p. 3674-3680, American Society for Microbiology.
"Summary of research documents on Cryptosporidium abstracted between 1995 and 1998" from Department of the Environment Transport and the Regions (May 6, 2004), 35 pages.
Paper entitled "Reaction of Commonly Used Chemicals with Ozone" accessed as "Ozone's Reaction with Common Chemicals from Ken Adachi", Sep. 29, 2006 at http://educate-yourself.org/ozone/ozonereactionswithcommonchemicals29sep06.shtml, 15 pages.
"Ozone Mass Transfer Analysis of an Injector with a Flash-Mix Reactor", by A-Bale, M. Gamal El-Din, D.W. Smith all of University of Alberta , A. Moawad of University of Cairo, P. Overbeck of GOT Water Process Corporation, Phoenix, Arizona and A. Mazzei of Mazzei Injector Corporation of Bakersfield California accessed Aug. 18, 2005 at http://www.gdt-h2o.com/flash-1.html, 3 pages.
Paper entitled "A Comparison of Point-of-Use Disinfection Methods" by P. Regunathan, PhD and W.H. Beauman (2008), 5 pages.
"Flash Reactor," Mazzei Injector Company website, accessed Jul. 6, 2009 (http://www.mazzei.net/products/flash_reactor.htm) 2 pages.
Leverenz, H. et al., "Review of Technologies for the On site Treatment of Wastewater in California", Center for Environmental and Water Resources Engineering, University of California, Davis; Aug. 2002, 250 pages.
Swagelok Company, "Check Valves: C, CA, CH, CP and CPA Series," www.sagelock.com, Apr. 2013, 16 pages.
Eagleton, J. "{03} in Drinking Water Treatment a brief overview 106 years & still going strong" drafted Feb. 1, 1999, 31 pages.
Simpson Environmental Corporation, "SW1 OM Ozone Generator Product," accessed Oct. 22, 2013 at http://www.senvc.com/show_pd_water_air.php?p_id=5, 4 pages.

(56) References Cited

OTHER PUBLICATIONS

"Mazzei FR-75 Flash Reactor" accessed Oct. 22, 2013 at http://www.spaparts.com.au/products/Mazzei-FR%252d75-Flash-Reactor.html, 4 pages.
"Mazzei 584 Efficient Venturi Unit (Injector)" accessed Oct. 22, 2013 at https://www.kiscosales.com/index.php?main_page=product_info&products_id=5744, 2 pages.

\* cited by examiner

OXIDATION PROCESS

This application is a continuation of U.S. patent application Ser. No. 13/619,243, filed Sep. 14, 2012, which claims the benefit of U.S. Provisional Application Ser. No. 61/535,483, filed Sep. 16, 2011, and which is a continuation-in-part of U.S. patent application Ser. No. 12/219,186, filed Jul. 17, 2008, which claims the benefit of U.S. Provisional Patent Application Ser. No. 60/935,128, filed Jul. 26, 2007, the specification and drawings of each of which are hereby incorporated in their entirety by reference herein.

FIELD OF THE INVENTION

This invention relates to the field of wastewater processing. In particular, the invention relates to the treatment of sewage, septage, leachate, pharmaceutical waste streams, ship ballast, or any of them in combination, so that the treated effluent is more desirable for disposal.

BACKGROUND OF THE INVENTION

This description relates to a method and apparatus for the treatment of water. In particular, the method and apparatus may be used to treat aqueous solutions to make those aqueous solutions more desirable or fit for disposal, either back to the environment or to render such aqueous solutions more fit for further treatment in other treatment facilities.

In the field of water treatment, great efforts have been made to deal with disinfection of water. Aqueous solutions requiring treatment include fluids some times referred to as grey water, that is, water which may be produced domestically, containing soap, washing fluids, and the like. Treatment is also required of black water, which is commonly referred to as sewage. There is no real difference between the biological and chemical profiles of grey water and black water. There is no real separation between grey water and black water and in most household situations, all such water is treated as though it were sewage. Sewage is often treated by central, municipally operated treatment plants. However, sewage is often also treated in local facilities, some times referred to as septic tanks. There are a number of options for local treatment competitive with septic tank treatment technology including various forms of bio-digesters and the like.

There are many other fluids which are not suitable for general disposal back to the atmosphere. Some examples in addition to grey/black water, domestic or industrial sewage include septage, leachate, pharmaceutical waste streams and ship ballast fluids.

Onsite wastewater treatment systems (OWTS) include systems that serve small communities, resorts, industry, and individual private residences not serviced by municipal infrastructure. It is this last group, individual private residences, or isolated resorts, with which we are particularly concerned because existing technologies have limited performance and a complete lack of supervision. The vast majority of these systems are septic systems, or involve disposal of untreated waste streams. Septic systems appeared over 100 years ago on farm properties with large tracts of virgin earth. These systems include a septic tank (collector/concentrator), some form of leaching bed (receiver), and the surrounding soil (distributor). This is primitive technology including anaerobic digestion followed by aeration and natural adsorption by the earth. These systems provide little disinfection (pathogens) and limited denutrification (carbon, phosphorus, and nitrogen). (Leverenz et al., 2002)(1). Regulations for these systems have not changed appreciably in over 40 years. The Ontario Rural Wastewater Centre at the University of Guelph states, "There are over 1 million septic systems in Ontario alone . . . High levels of rural groundwater contamination indicates that many of these systems are working below acceptable levels and changes are required to alleviate the problem." "Water quality problems in the rural portions of Canada are large and occur throughout the country." (Joy et al., 2001)(2).

In the case of septic tanks or similar systems, a processing tank (reactor) is normally provided. In order to keep the septic tank system working for its normal useful life, the septic tank is intended to be pumped periodically to remove the solids and heavy liquids which collect in the bottom of the septic tank. This pumped out material is often referred to as septage. In some jurisdictions, septage can be distributed over agricultural land provided that the septage is widely distributed so as to have an acceptable local effect so that natural digestion of the material is safely accomplished. However, a number of jurisdictions are either banning outright or severely restricting the amount of septage that can be spread on the ground. Where such regulations exist, then septage must be treated in a municipal operated sewage treatment system or some such similar facility. Septage is, in large measure, a concentrated collection of materials precipitated in the septic tank and may require significant dilution before being acceptable to the operator of the treatment facility.

Increasingly, this primitive technology has been used on much smaller tracts of land and waterfront properties. The result has been increased contamination of wells with pathogens and overload of water bodies with nutrients. Once these contaminants are in groundwater, they eventually reach rivers and lakes. In other words, once there is a pollution problem, it may be only a step away from a water supply problem. (Environment Canada—Groundwater Contamination)(3). The need for new technology was clear. In response to this need, enhancements were designed to operate in conjunction with traditional systems. These included both media bioreactors and membrane bioreactors. Those add-ons provided improved disinfection, good reduction of suspended solids and carbonaceous compounds and fair reduction of nitrogen, with re-circulation, but little reduction of phosphorus. While these systems were tested on sewage and provided acceptable results, they were expected to process septage, and the results were not very good.

Rain or ground water passing through a waste dump site, can leach various compounds from the dump. The water collected at the bottom of a dump site is some times referred to as leachate. Leachate can be a significant source of what is termed "pollution", that is, material being released to the environment which is not acceptable in the environment. It would be desirable to have a system for treating leachate, which is an aqueous solution, to make the leachate more suitable for either release to the environment or for further treatment in other treatment facilities.

It is becoming recognized, that treated water flowing from some treatment plants is a source which releases pharmaceuticals into the environment. When mammals are prescribed pharmaceuticals, the pharmaceuticals are introduced into the body and utilized by the body. However, in most cases, the pharmaceutical is not completely metabolized in the body. Thus, at least some of the pharmaceuticals injested may be excreted from the body. Also, many pharmaceuticals are designed to be stable (non-reactive) in a bacterial environment (namely the human gut) and are not broken down in bioreactors. In other cases, some of the medicine may be metabolized to secondary compounds, but not utilized by the body, and these also are excreted, and then become a component in sewage. Often these pharmaceuticals, whether as primary products or as secondary products, are not effectively treated in some sewage treatment plants. This results in pharmaceuticals being released into the environment.

Cargo ships and other large vessels often take on or discharge ballast water to control ship operating parameters. Discharge of untreated ballast water may involve release of invasive pathogens and species into non-native environments. Thus, there is a need to treat ballast water prior to release to inhibit these problems.

Thus, there are many sources of aqueous solutions that could benefit by treatment. In some cases the treatment may be satisfactory to give treated aqueous solution acceptable for disposal, while in other cases the treatment may render the aqueous solution a more acceptable product for further treatment in other facilities.

The emerging concern over compounds including disinfection by-products (DBPs), volatile organic compounds (VOCs), and pharmaceuticals (PHARMA) in both drinking water and the environment, has created a whole new dimension for the needed capabilities of private residential OWTS. Existing technology, both traditional and enhanced, have little chance of effectively reducing these compounds in a timely way. Without new technology, collectively the uncontrolled discharge from these private residential OWTS, will become the largest contributor of compounds of emerging concern (CECs) to the environment.

U.S. Pat. Nos. 6,402,945 and 6,673,251 illustrate an apparatus and system for treating aqueous solutions by injecting ozone into a recirculation conduit. While those patents illustrate useful methods and apparatus, it would be advantageous to have a process and system which not only disinfects, but also has other beneficial affects on the treatment of the aqueous solution.

Among other of the components of sewage are typically phosphorus and nitrogen. Where there are a concentration of septic systems such as in rural homes or cottages surrounding a lake or river, there may eventually be an overload of phosphorus and nitrogen compounds released by the septic systems into the ground water and ultimately, the lake or river. As development around a localized water resource occurs, there will ultimately become a point at which the natural environment will not be able to safely handle the amount of phosphorus and nitrogen released from the septic systems. When the presence of these nutrients increases, certain plant species such as algae or phytoplankton can grow above normal levels which in turn causes problems for the other species trying to grow around them. Excessive algae growth blocks sunlight from the vegetation beneath the water's surface which can cause massive die off of plant species. It also produces a significant amount of organic material that also uses up valuable oxygen as it decomposes and contributes to foul smelling and tasting water.

SUMMARY OF THE INVENTION

In accordance with the invention, an apparatus for treating aqueous solutions for disposal, comprises a processing tank (reactor), the processing tank (reactor) having a fluid inlet and a fluid outlet. The apparatus also includes a recirculation conduit, the recirculation conduit being fluidly connected to the fluid inlet and the fluid outlet. The recirculation conduit includes a pump for recirculating fluid in the processing tank (reactor) through the conduit and back into the processing tank (reactor) in a flow direction. The recirculation conduit also includes an ozone injector for injecting ozone into fluid being circulated by the pump. The ozone injector is downstream of the pump. The recirculation conduit also includes a pressure valve. The pressure valve is located within the recirculation conduit downstream of the ozone injector. The pressure valve is adapted to maintain a pressure in the portion of the recirculation conduit between the pump and the valve at a pressure above atmospheric.

A process in accordance with the invention for the treatment of aqueous solutions so that the treated product is more desirable for disposal, includes obtaining an aqueous solution for treatment. The aqueous solution is treated by an advanced oxidation process. The advanced oxidation process includes causing ozone to be mixed with the influent. The process further includes maintaining the mixture of influent and ozone at a pressure above atmospheric for a time of at least two seconds.

A system in accordance with the invention includes measuring the oxidation/reduction potential (ORP) of the solution being treated and continuing the treatment process until the ORP reaches a predetermined level.

In another aspect of the invention there is a batch process for the treatment of an aqueous solution so that the treated product is more desirable for disposal, the process includes obtaining a first influent batch of aqueous solution for treatment, treating the batch of solution by an advanced oxidation process, the advanced oxidation process comprising causing ozone to be mixed with the solution, and, after having treated the first influent batch with ozone, combining at least a portion of the treated first batch with a second influent batch of aqueous solution for treatment.

A feature of that aspect of the invention includes discharging a first portion of the first batch of aqueous solution after treatment thereof; retaining a second portion of the first batch; and combining the second batch of aqueous solution to be treated with the second portion of the first batch of aqueous solution. Another feature includes treating of the first batch includes elevating the pressure of at least a part thereof and injecting ozone into that part while at elevated pressure. In still another feature, the batch process occurs in a reactor apparatus, the reactor apparatus has a total volume of solution therein, the first batch has a first volume, and the first volume is less than the total volume of solution. In another feature, the second batch has a volume that is in the range of one half to four-fifths of the total volume of solution. In still another feature, introduction of the second batch occurs substantially immediately after completion of treatment of the first batch. In another feature, introduction of the second batch occurs within less than 15 minutes of completion of treatment of the first batch. In a further feature, introduction of the second batch occurs within 5 minutes of completion of treatment of the first batch. In a still further feature, introduction of the second batch occurs within 2 minutes of completion of treatment of the first batch. In another feature, at completion of treatment, the first batch of solution has an ORP in excess of 600 mV; and introduction of the second batch while the treated first batch retains an ORP of greater than 450 mv. In a further feature, introduction of the second batch occurs while the treated first batch has an ORP of greater than 600 mV. In still another feature, the process includes repeating the process with at least a successive third batch of aqueous solution to be treated. In yet another feature the process includes post-processing a first portion of the first batch of aqueous solution while the second batch of aqueous solution is being treated. In a still further feature, at least a first portion of the first batch of aqueous solution is discharged after treatment thereof and prior to addition of the second batch of aqueous solution, and the first portion is subjected to post-processing after is discharged. In a further feature the further processing includes filtering. In another further feature, the further processing includes retaining the first portion in a holding tank prior to further processing.

In another aspect of the invention there is a batch process for the treatment of an aqueous solution so that the treated product is more desirable for disposal. The process includes obtaining a first influent batch of aqueous solution for treatment, treating the batch of solution by an advanced oxidation process, the advanced oxidation process comprising causing ozone to be mixed with the solution, and, after having treated the first batch, treating a second influent batch of aqueous solution within fifteen minutes thereafter.

In a feature of that aspect of the invention, treatment of the first batch and second batches includes elevating the pressure of at least a respective part of each thereof and injecting ozone into that part while at elevated pressure. In another feature, the batch process occurs in a reactor apparatus, the reactor apparatus has a total volume of solution therein, the first batch has a first volume, and the first volume is less than the total volume of solution and the second batch has a volume that is in the range of one half to four-fifths of the total volume of solution. In still another feature, introduction of the second batch occurs within 2 minutes of completion of treatment of the first batch. In yet another feature, at completion of treatment, the first batch of solution has an ORP in excess of 600 mV; and introduction of the second batch while the treated first batch retains an ORP of greater than 450 mv. In another feature, the process includes repeating the process with at least a successive third batch of aqueous solution to be treated. In still another feature, the process includes post-processing a first portion of the first batch of aqueous solution while the second batch of aqueous solution is being treated, and at least a first portion of the first batch of aqueous solution is discharged after treatment thereof and prior to addition of the second batch of aqueous solution; the first portion is subjected to post-processing after is discharged; and the further processing includes at least one of (a) retaining in a holding tank for a period of time, and (b) filtering.

In still another aspect of the invention, there is a batch process for the treatment of an aqueous solution so that the treated product is more desirable for disposal. The process includes obtaining a first influent batch of aqueous solution for treatment, treating the batch of solution by an advanced oxidation process, the advanced oxidation process comprising causing ozone to be mixed with the solution, and, after having treated the first batch, treating a second influent batch of aqueous solution within fifteen minutes thereafter.

In a further aspect of the invention, there is a batch process for the treatment of an aqueous solution so that the treated product is more desirable for disposal. The process includes obtaining an influent batch of aqueous solution for treatment, treating the batch of solution by an advanced oxidation process, the advanced oxidation process comprising causing ozone to be mixed with the solution; reducing pressure on the batch of solution; and off-gassing the solution prior to re-exposing the solution to injection of additional ozone thereto.

In a feature of that aspect of the invention the batch process includes maintaining the mixture of solution and ozone at a pressure above atmospheric during injection and mixing thereof with the ozone. In another feature the method includes reducing pressure of the solution prior to degassing the solution. In a further feature, the method includes repeated cycles of ozonation at high pressure and degassing at lower pressure.

In a further aspect of the invention there is a batch process for the treatment of an aqueous solution so that the treated product is more desirable for disposal. The process includes obtaining an influent batch of aqueous solution for treatment, treating the batch of solution by an advanced oxidation process, the advanced oxidation process comprising causing ozone to be mixed with the solution while the solution is maintained at a pressure higher than ambient air pressure; and, after treatment thereof, filtering the solution.

In a feature of that aspect, the step of filtering includes mechanical separation of non-liquids therefrom. In another feature, the step of filtering includes chemical filtering thereof. In still another feature, after treatment of the batch with the ozone, at least a part of the solution is retained for a period of time without further addition of ozone prior to filtering. In another feature, the period of time is shorter than the time period of treatment of the batch with ozone.

In a further aspect of the invention there is a batch process for the treatment of an aqueous solution so that the treated product is more desirable for disposal. The process includes obtaining an influent batch of aqueous solution for treatment, treating the batch of solution by an advanced oxidation process, the advanced oxidation process comprising causing ozone to be mixed with the solution while the solution is maintained at a pressure higher than ambient air pressure; and, after treatment thereof, retaining at least a portion of the batch for a period of time without further addition of ozone thereto; and then, after the period of time, filtering the solution.

In a yet further aspect of the invention there is a batch process for the treatment of an aqueous solution so that the treated product is more desirable for disposal. The process includes obtaining an influent batch of aqueous solution for treatment, the solution including pharmaceuticals, treating the batch of solution by an advanced oxidation process, the advanced oxidation process comprising causing ozone to be mixed with the solution while the solution is maintained at a pressure higher than ambient air pressure.

BRIEF DESCRIPTION OF THE DRAWINGS

Further and other aspects and features of the invention will be more clearly understood from discussion of the following examples of processes and apparatus in accordance with various embodiments in accordance with the invention. Drawings illustrating an apparatus in accordance with embodiments of the invention follow and, in which:

FIG. 5b shows an alternative to the embodiment of FIG. 5a;

FIG. 5c shows a time v volume chart showing the operating cycle v. time for elements of the embodiment of FIG. 5a;

FIG. 5d shows a duty cycle representation of the treatment system of FIG. 5a;

DETAILED DESCRIPTION

Figure 1:
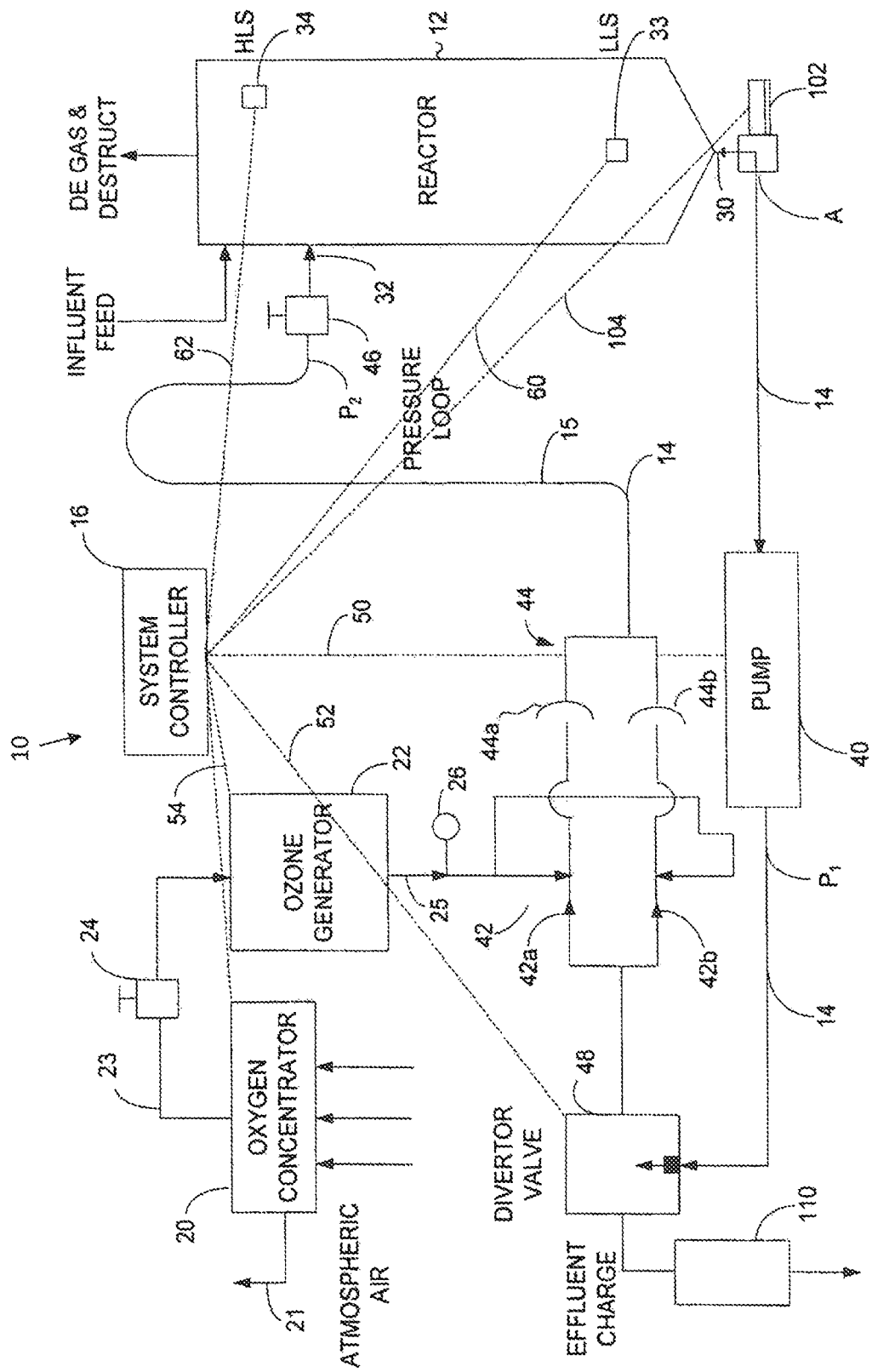
FIG. 1 is a schematic flow chart of a first apparatus in accordance with the invention.

The description that follows, and the embodiments described therein, are provided by way of illustration of an example, or examples of particular embodiments of the principles of the present invention. These examples are provided for the purposes of explanation, and not of limitation, of those principles and of the invention. In the description, like parts are marked throughout the specification and the drawings with the same respective reference numerals. To the extent that the illustrations herein include piping symbols, those piping symbols are thought to be conventional in the art, and, unless otherwise indicated, are intended to have the meanings of those symbols as conventional in the art. The presence of an arrow on piping indicates the intended direction of flow, whether a check valve is shown or not. Check valves are shown as triangles within a circle, with the point of the triangle indicating the direction of flow. Positionable valves movable between open and closed position, or movable to partially open positions to constrict flow, may be shown as a cross in a circle, with a T-stem. Pumps are typically indicated as a circle with an inscribed propeller blade. Although pairs of valves may be shown controlling optional flow directions, the illustration of valves does not preclude the embodiment of optional flow in a three-way or multi-way valve. In this description valves are understood to be electronically controlled unless otherwise indicated. The operation of two or more valves may be linked together, as when the closing of one valve occurs contemporaneously with the opening or closing of another.

The basic mechanism for treating an aqueous solution to render it more desirable for disposal in accordance with this invention involves an advanced oxidation process. In an advanced oxidation process, the aqueous solution is mixed with ozone. When ozone is mixed with an aqueous solution, the ozone inter-reacts with the compounds and organisms within the solution to reduce the amount of undesired chemicals in, and disinfection of the solution. Such a system and apparatus are described in our previous U.S. Pat. Nos. 6,402,945 and 6,673,251, the entire disclosures of which are incorporated herein by reference.

It has been found that there are very substantial benefits that may be obtained by maintaining a mixture of the aqueous solution and ozone under pressure above atmospheric for at least a selected time period. Increasing the pressure to which the mixture is subjected provides increased results. Increasing the duration of time for which the mixture is kept at increased pressure also has desirable benefits in the treatment of the aqueous solution, thereby rendering it more desirable for disposal.

FIG. 1 illustrates an apparatus in accordance with the invention. The treatment apparatus, illustrated in the schematic generally at 10, includes a processing tank or vessel, however it may be called, and such as may be identified as a reactor 12; piping defining a flow passageway, identified as a recirculation conduit 14; and a control system 16. Treatment apparatus 10 also includes an oxygen concentrator 20, and an ozone generator 22. Treatment apparatus 10 may draw a supply of material to be treated from a source such as indicated by the large tank 125 shown in FIGS. 5a and 5b. Tank 125 is intended generically to represent a reservoir of flowable material to be treated, be it a septic bed, a septic tank, a sewage system, a wastewater holding tank, a pump-out truck of wastewater, a lagoon, and so on. The volumetric capacity of tank 125 may be considered to be large, if not very large, as compared to treatment apparatus 10. The fluid to be treated may be a single phase liquid, or it may be a slurry or two-phase liquid with suspended or entrained solids. The flowable material to be treated may be urged into treatment apparatus 10 either by gravity, or by such means as a pump 27.

The recirculation conduit 14 is fluidly connected to a fluid outlet 30 from reactor 12. The recirculation conduit 14 is also connected to a fluid inlet 32 of the processing tank, reactor 12. The recirculation conduit 14 further includes a pump 40. The pump 40 withdraws fluid to be treated from the reactor 12 and recirculates it, along the length of the recirculation conduit 14 and then reintroduces the fluid into the tank 12. In the embodiment illustrated herein, the pump 40 may be sized to pump a quantity of fluid Q, at least equal to the amount of fluid contained within processing tank 12, associated pipe conduits 14, and mixer set 44 within not greater than five minutes. Other size pumps may be utilized in accordance with this invention, but a pump of this capacity has proven effective.

To maintain a fixed quantity of fluid in the tank at the time treatment is commenced, the processing tank 12 includes a low level fluid sensor 33 and a high level fluid sensor 34. When a source of aqueous solution to be treated is obtained, it is transferred to processing tank 12 until such time as the high level sensor senses that fluid level. Then, no more fluid is allowed into the processing tank (reactor) and the treatment process may thereafter begin on a batch process basis.

The recirculation conduit 14 further includes an ozone injector set 42, and a mixer set 44, which may be a static mixer set, but, in any event is a mixer in which ozone may be introduced into the subject flow to be ozonated. The recirculation conduit 14 also includes a pressure device 46, in one embodiment a valve, by which to constrict flow and thereby maintain an elevated pressure upstream thereof. Recirculation conduit 14 also includes a diverter valve 48. Diverter valve 48 may be utilized to control the passage of fluid from pump 40 either for recirculation throughout the entire length of the recirculation conduit 14 or when switched, diverter valve 48 redirects flow to permit discharge of treated fluid for after-treatment collection, disposal, or further post-processing or use.

Oxygen concentrator 20 is open to the atmosphere so as to draw in atmospheric air. Oxygen concentrator 20 may also or alternatively be connected to sources of oxygen such as industrial grade and/or medical grade oxygen. Use of atmospheric air as the input source to oxygen concentrator 20 may be typical as convenient and inexpensive. Oxygen concentrator 20 separates most of the nitrogen, argon and humidity from the inlet air. The separated gases are given off through a vent 21. A typical oxygen concentrator which may be used is the Sequal Technologies Inc. model 1265. Oxygen concentrator 20 is connected to an oxygen delivery conduit 23. The oxygen delivery conduit 23 passes through an oxygen flow control valve 24 and then into ozone generator 22. The oxygen flow control valve is what is referred to as a "very fine metering" valve. An example is the model SS-SS4 valve available from SWAGELOK company. A useful ozone generator is the Simpson Environment model SW10M. Ozone generator 22 is connected to the inlet of ozone injector set 42 by an ozone delivery conduit 25. Ozone delivery conduit 25 may include a manometer 26 to measure vacuum pressure created at the suction port of the ozone injector set 42.

Controller 16 is electrically connected for control to the following components: control line 50 of the pump 40, control line 52 of the diverter valve 48, control line 54 of the ozone generator 22, control line 60 of the low water sensor 33, control line 62 of the high water sensor 34 and control line 104 of electrode 102.

Pump 40 withdraws fluid from the processing tank 12 and delivers fluid downstream of the pump at a pump output pressure $P_1$. The aqueous solution being treated then passes through diverter valve 48, in the apparatus as shown, then through ozone injector set 42. To enhance flow rates and good injection, ozone injector set 42 may include one, two, or more individual injectors 42a, 42b, etc., operating in parallel. An example used in the tests referred to herein is the model 584 from Mazzei Injector Corporation. As the fluid passes through the ozone injector set 42, a vacuum pressure may be created at the venturi(s) of ozone injector set 42, thus drawing ozone into the aqueous fluid. Ozone is mixed with the aqueous fluid in ozone injector set 42. However, as the fluid passes along the recirculation conduct 14 downstream of the ozone injector set 42, it passes through mixer set 44. An example of a suitable mixer is the Mazzei Injector Corporation model FR-75-X. Mixer set 44 may include a separate mixer 44a, 44b, etc., one for each ozone injector 42, 42b, etc. After passing in the downstream direction from mixer set 44, the fluid being treated passes along a pressure portion 15 of the recirculation conduit 14, that pressure portion 15 having considerable length. After passing through that pressure portion 15 of recirculation conduit 14, the aqueous fluid passes through the pressure device 46.

From reviewing the diagram and the above description, it will be noted that the fluid is under pressure delivered by the pump within the portion of the treatment conduit leading up to the ozone injector set and onward downstream to the pressure device 46. By adjustment of the pressure device 46, either manually or by a controller, significant back pressure is created, so that the pressure portion 15 of the treatment conduit extending from the ozone injector set 42 to the pressure device 46, is kept under a desirable pressure.

The time during which the aqueous solution to be treated is kept under pressure while travelling from the ozone injector set 42 to the pressure device 46 is a function of the volume being pumped and the conduit cross section and the length of the portion 15 of recirculation conduit 14 from ozone injector 42 to pressure device 46. By making pressure portion 15 of the recirculation conduit 14 longer for a given cross sectional area, the aqueous fluid will may be maintained under the desired pressure for a longer time on each recirculation pass. Controller 16 controls the operation of the pump.

One embodiment of process herein involves the treatment of the aqueous solution to be treated with ozone at higher than atmospheric pressure. The effectiveness of the ozone treatment may be enhanced by ensuring better contact between the ozone and the aqueous solution to be treated. Ozone is a gas. The amount of gas that may be dissolved in a fluid increases with pressure. Thus, operating the portion of the recirculation conduit downstream of ozone injector 42 and mixer set 44 at a pressure higher than atmospheric, may help to keep the ozone in intimate contact with the aqueous fluid, and perhaps to dissolve the ozone within the aqueous fluid. Increasing the pressure in pressure portion 15 of recirculation conduit 14 between ozone injector set 42 and pressure device 46 results in increased effectiveness of the treatment. The pressure in the pressure portion 15 of the recirculation conduit 14 may be greater than the partial pressure of the ozone at the ambient operating conditions. The higher the pressure in pressure portion 15 the more ozone that can be dissolved. If the pressure in pressure portion 15 is only at 0 gauge pressure and if atmospheric conditions are at low pressure, very little ozone injected may be dissolved in the aqueous solution.

In the tables set out below, solutions to be treated were obtained from a domestic sewage stream and an influent stream for a municipal sewage treatment plant. The municipal input stream includes sewage from domestic sources, commercial sources and industrial sources. The following tables illustrate various characteristics of the fluids before and after treatment. The following symbols have the following meaning. The symbol $BOD_5$ represents the biochemical oxygen demand of the fluid. CBOD is presented in milligrams per liter and reflects what is referred to as the carbonaceous (non-nitrogenous) biochemical oxygen demand of the fluid. The symbol TSS represents the total suspended solids in the solution. The symbol Total P represents the total phosphorus content of the solution. The symbol TKN (Total Kjeldahl Nitrogen) is a measure of the total nitrogen component of the solution. The symbol *E Coli* refers to the *E Coli* microorganism in the water.

In a first test, Table I, a system similar to that depicted in previous patents, but with a filter, was used. Table I illustrates the enhanced treatment which occurs at 1½ A as compared to 1 ATM in the treatment conduit. The tests of Table I were made using influent domestic sewage. An apparatus as depicted schematically in FIG. 1 was used for the tests of Tables II and III. Processing reactor 12 had a batch capacity of 60 litres. Pump 40 had a capacity to pump approx. 40 litres per minute. Ozone injector set 42 was made up of two Mazzei injectors operating in parallel. Ozone injector set 42 has a capacity to inject greater than 1.65 mg of ozone per litre of solution passing through each of the two injectors. The system was operated on a batch of aqueous solution for a continuous period of minutes. Thus, on average, the solution being treated, passed through the injector set about 20 times in 30 minutes.

A test on a second batch of municipal sewage influent was carried out at pressure of 1.5 ATM and 2 ATM in pressure portion 15. See Table II. The pressure immediately upstream of ozone injector set 42 was measured at 45 psi while the pressure immediately upstream of the pressure control valve was measured at 20 psi in the first run. Thus, the aqueous fluid was maintained under a pressure of about 1.5 ATM. In the second run, the pressure immediately upstream of the ozone injector set 42 was measured at 48 psi while the pressure immediately upstream of the pressure device 46 was measured at 28 psi. Thus, the aqueous fluid was maintained under a pressure of about 2 ATM in pressure portion 15. Thus, Table II illustrates the improvement particularly in denutrification from increasing the pressure in the pressure section. A third test on a third batch of municipal sewage influent was carried out for 2 seconds and 12 seconds residence time in the pressure portion 15. See Table III. (Increased residence time occurred by increasing the length of the pressure portion 15 downstream of the ozone injector set 42). Table III shows the enhanced denutrification with greater residence time.

Pressure, if sustained for a period of time, can be of benefit. An extended treatment conduit terminated with a restrictor diffuser or valve may be used. With a substantially constant speed, constant displacement pump, while the restrictor or valve influences the pressure, it may tend to have only a little effect on the flow. In embodiments herein, the time under pressure may be greater than ten seconds to be more effective. The length of the conduit may be calculated with a knowledge of the time, flow, and inside diameter of the conduit. To achieve a time of 10 seconds within the conduit, for a flow of 50 litres/minute, a 2.5 cm dia., conduit would be about 17 metres in length.

Recirculation of the aqueous fluid to be treated, through the ozone injector set 42, using the pressure processes outlined above has been observed surprisingly to produce substantial reductions in $BOD_5$ CBOD and TSS. Additionally, there has been a substantial reduction in total phosphorus and total nitrogen.

TABLE I

| PARAMETER | PERCENTAGE REDUCTION | |
|---|---|---|
| | 1 A | 1½A |
| $BOD_5$ | 85.0% | 88.5% |
| CBOD | 61.0% | NR |
| TSS | 92.0% | 97.0% |
| TP | 38.0% | 94.8% |
| TKN | 27.0% | 79.5% |

TABLE II

| PARAMETER | PERCENTAGE REDUCTION | |
|---|---|---|
| | 1½A | 2A |
| $BOD_5$ | 56% | 81% |
| CBOD | 61% | 69% |
| TSS | 83% | 94% |
| TP | 28% | 60% |
| TKN | 11% | 49% |

TABLE III

| PARAMETER | PERCENTAGE REDUCTION | |
|---|---|---|
| | 2 sec | 12 sec |
| $BOD_5$ | 84% | 94% |
| CBOD | 83% | 92% |
| TSS | 98% | 99% |
| TP | 66% | 89% |
| TKN | 17% | 39% |

At the outset of the test shown in Table III, the *E Coli* of the test solution in the first test measured in excess of 300,000. This had been reduced to a count of less than 2 after 30 minutes of continuous recirculation through the recirculation conduit of the apparatus referred to above. This represents a 99.999% reduction in *E Coli*, or a five log disinfection of the fluid.

The reduction of *E Coli*, illustrates that the disinfection of the fluid is not reduced in any way when carrying out the present invention and is probably enhanced from what might have been expected from our earlier work. The above tests clearly show that, surprisingly, maintaining the fluid being treated under pressure above atmospheric, and doing so for a longer period of time, each enhance the treatment effect.

Denutrification as used herein describes the reduction of nutrients in an aqueous solution. The nutrients include both biological and chemical organic compounds and elements. Useful measures of these nutrients include Biochemical Oxygen Demand ($BOD_5$), Carbonaceous (Non-Nitrogenous) Biochemical Oxygen Demand (CBOD), and Total Suspended Solids (TSS). Included in these measures are the elements, phosphorus and nitrogen, which are measured as Total Phosphorus (TP), and Total Kheldahl Nitrogen (TKN). These elements are of particular interest because they have a significant uptake of dissolved oxygen.

Denutrification may be accomplished by advanced oxidation using ozone. This process is manifested in a number of ways.

Complete Oxidation—the change of complex compounds and elements into different form by satisfying their oxygen demands, for instance, altering the nature of phosphorous compounds, i.e. altering bound phosphorus compounds or ammonia can be broken down to nitrogen, oxygen and water according to the reaction: $2NH_4OH+3O_3 N_2+5H_2 0 \rightarrow 3O_2$ Partial Oxidation—the change of complex compounds by molecular damage rendering them vulnerable to further change Off Gassing—this is in particularly applicable to nitrogen, $N_2$ Microflocculation—these are collections of particulate which remain suspended in solution Precipitation—these are again collections of particulate which do not remain in solution.

Oxidation of phosphorous and nitrogen compounds produces microflocs and precipitates which may include phosphates, orthophosphates, nitrates, nitrites, etc. The ozone does not react directly with phosphorous but with compounds of phosphorous.

Upon discharge, the microflocs and precipitates referred to above may be captured by a multi-gradient filter 110 before release to the environment. An example of a useful filter is the twenty-five to one (25-1) micron pre-filter, 20 inch high heavy duty filter sold under the trade mark Pentek Big Blue (25-1).

The above tests show that maintaining a mixture of aqueous solution to be treated and ozone under a pressure of at least one and a half atmospheres, and more preferably, 2 atmospheres, results not only in a desired disinfection but also a surprisingly substantial reduction in phosphorus and nitrogen as well as $BOD_5$ and CBOD of the treated fluid. This is referred to generally as denutrification.

Ozone Amount Optimization

Improved results have been achieved in a shorter operating time by encouraging that an optimal amount of ozone is injected as the system operates. As the system operates, there is a continual input of energy to the solution being treated arising from the operation of the circulating pump. Passage through various of the components in the recirculation conduit and perhaps the treatment tank itself, all add to the energy level of the fluid. Thus, as might be expected, during tests of this type, the temperature of the fluid tends to increase as the circulation time increases. Increasing temperature, increases the difficulty of introducing ozone into the aqueous solution at least partially to dissolve the ozone. It has been observed that the total amount of gas being introduced into the aqueous solution by the ozone injector remains a factor. Thus, if the gas being injected by the ozone injector has other components other than ozone, such as either oxygen or nitrogen, then the amount of ozone being injected will not be optimized.

The system and process may optimize ozone injection. For any given ozone generator 22, there will be a maximum amount of ozone that can be produced. In the case of the model SW10M referred to above it was determined that this was 5.50 standard cubic feet per hour (SCFH). With this information, the oxygen flow control valve 24 is then adjusted to provide the corresponding amount of oxygen from the oxygen concentrator to produce the flow of 5.50 SCFH ozone. The next step is to adjust the suction pressure at the ozone injector set 42. This can be done with the aid of a manometer 26. The system is adjusted so that the suction at the injector set produces a suction drawing 5.50 SCFH of ozone. This is achieved by adjusting pressure device 46 which may be done by manual control. The back pressure created by pressure device 46 creates a back pressure of approximately 25 psi, that pressure being in the range of 1.5 to 2.0 atmospheres. The above adjustments may be made using manometer 26 in the first instance connected in a flow mode and in a second instance connected in the suction mode.

While the above figures are specific to the system utilized in the apparatus discussed in detail herein and in particular the SW10M model ozone generator, this system can be utilized more generally to optimize the operation of any apparatus as discussed herein.

By observation, feeding too little oxygen to the ozone generator 22, may tend to result in a less than optimum level of ozone being generated, with the negative effect that the gas injected at the ozone injector 42 may have a higher than desirable nitrogen component. The nitrogen component then reduces the amount of ozone that may be dissolved in the circulating fluid. On the other hand, feeding too much oxygen from oxygen concentrator 20, delivers more oxygen to ozone generator 22 than ozone generator 22 is capable of handling. This may yield an excess of oxygen in the gas to be injected through ozone injector set 42. Again this reduces the potential for optimized ozone injection. Thus, the oxygen flow control valve 24 is adjusted to optimize the flow of oxygen from the oxygen concentrator 20 so as to give the optimized performance characteristics of the ozone generator 22 and in turn to optimize the amount of ozone that may be dissolved in the circulating fluid.

While the above tests and disclosure show the advantages and potential for treating influent streams as discussed above, one of the aspects of any such treatment system is to provide a monitoring system to show that the desired level of treatment has been achieved. As the influent may differ rather very substantially in content, from influent streams that are relatively easily treated, (such as domestic sewage), to streams having a different content which may be much more difficult to treat, (including commercial and industrial waste), different processing times may be required depending upon the nature of the influent and the desired characteristics of the system effluent. As a first level of desirability, it is often first required that the influent be treated to the level at which there is reasonable confidence that disinfection to the desired extent has occurred. In other situations, it may be desirable to ensure that the fluid being treated has been treated to a level of denitrification as may be desired.

According to readings observed, the oxidation/reduction potential (ORP) of the fluid rises during processing. The change in ORP can be correlated to the oxidation level of the fluid being treated. Initial analysis shows that light domestic sewage may typically have an ORP of +50 mV prior to processing. Fluids requiring substantially more processing such as heavy municipal sewage which may include industrial and commercial components, may have an ORP of −350 mV. On the other hand, as the fluid is oxidized, the ORP will rise to much higher voltages. De-chlorinated, de-ionized test water has often been shown to have an ORP of +200 mV. Chlorinated municipal water will often have an ORP of +350 mV.

At an ORP of +650 mV, bacteria will have been killed virtually instantaneously. This figure has been reported by the World Health Organization as a figure indicative of an ORP at which all bacteria has been killed. Through testing to date, we have determined that there is a very substantial denutrification, when the ORP rises to about +800 mV.

Accordingly, there is a process monitoring system for use with the system as outlined above. A suitable monitoring system may be mounted to monitor flow at the expected location of liquid of the worst quality, such as at the location of liquid just as it leaves processing tank 12. Processing tank 12 may include a conical shaped bottom as indicated at 100 in FIG. 1. The advantage of the conical bottom is that if there is any sediment or other unusual flow patterns within the processing tank 12, the fluid being processed and withdrawn from the pointed low end of the conical bottom 100 will contain as high a concentration of sediment or other material to be treated as may be found within the processing tank 12. This may also help to circulate solids or other materials that might otherwise collect if the processing tank were flat-bottomed.

To monitor the system, and system operation, an electrode 102 is installed in the portion of the recirculation conduit 14 between the processing tank 12 and the recirculation pump 40. Locating electrode 102 in this portion of the recirculation conduit helps to ensure that the electrode measures the condition of the influent being processed at the least desirable portion of the treatment conduit. If the electrode were to be installed in pressurized section 15 of recirculation conduit 14, then electrode 102 may be more likely to give an erroneously beneficial reading. As the process involves withdrawing influent from processing tank 12 through pump 40 prior to discharge, for monitoring purposes electrode 102 is placed upstream of the pump and downstream of processing tank 12 as illustrated in FIG. 1.

A twin platinum electrode may be used. Electrode 102 sends a signal to an ORP controller. One such instrument that may be used is available from Pulse Instrument bearing the model designation 117E. The controller function for electrode 102 as illustrated in FIG. 1 may be a separate controller or may be part of the control 16 illustrated in FIG. 1. The electrode 102 communicates with the control 16 through control line 104.

When the system is operating, electrode 102 may provide continuous voltage readings monitoring the fluid passing along the treatment conduit up stream of the pump 40. At the outset of the treatment process, ORP may be negative or slightly positive, depending upon the nature of the influent being treated. As the influent circulates and is processed and as ozone is injected into the influent, all as explained above, the monitored voltage may be seen to rise. Depending upon the nature of the influent and the level of treatment required, the time to process the fluid to a desired level will vary.

As set out above and as recognized by the World Health Organization, once ORP rises to a consistent reading of 650 mV, there is sufficient confidence that bacterial content in the fluid will have been killed. Thus, once a consistent reading of 650 mV is achieved, the fluid may be discharged if that is the desired treatment level. As the fluid readings may vary slightly during treatment, a more convenient way of monitoring the system is to continue to process the fluid circulating until the reading is consistently above the 650 mV level say, for example, 675 mV. By selecting the 675 mV level there is better assurance that all portions of the fluid have been processed to at least the 650 mV level desired. Such a processed fluid would then have been disinfected to a desired level.

Where the treatment desired includes significant de-nutrification, the processing may be continued until the ORP of the treated fluid rises to a consistency of substantially 800 mV.

Table IV shows an example of a fluid that is de-chlorinated, de-ionized test water at the outset. The ORP measured in mV at time zero was +118 mV. As shown, the ORP rose through 185 mV after one minute, 383 mV after two minutes and 910 mV after four minutes.

Table V includes data for a similar test in which the fluid to be treated was obtained from a municipal sewage plant. At the outset the ORP measured +380 mV. The table shows that the ORP rose to over 800 by fifteen minutes and that further processing did not substantially increase the ORP reading. Thus, for practical purposes the processing to achieve disinfection and denitrification to an acceptable state had been successfully concluded after twenty minutes. Although the fluid was obtained from a municipal sewage plant, the ORP measurement of +380 mV appears to be misleadingly high. In the embodiment discussed herein, the system may have a capacity of 60 liters in the treatment tank and associated piping. However the controls are set to treat a batch, and then dispose of, or direct to other post-processing steps, 40 liters of the 60 liters that have been treated. The balance of 20 liters may remain in the tank and associated piping. In the example, the previous batch treated had been de-chlorinized, de-ionized water which had an ORP of +910 mV following processing. As only 40 liters of that batch were disposed of, the equipment contained 20 liters of water having an ORP of +910 to which was mixed the sewage influent. In this case, the reading of +380 mV was the analysis of the mixed fluid comprising 40 liters of sewage and 20 liters of the ionized water. Upon realizing this error in the readings, all other readings referred to herein measure the influent prior to being transferred into the processing tank.

Tables VI and VII illustrate the values for a repeat test done a few weeks after the tests referred to above. Again the first test was carried out with de-chlorinated, de-ionized test water, while the second test was carried out using a sample obtained from a municipal sewage collection system.

As set out in Table VI, with respect to de-chlorinated de-ionized water, the ORP rose from a starting value of +100 to a value of +600 within four minutes. In Table VII, the meter measured an ORP value for the municipal sewage at the outset at −200 mV and a reading of +650 mV was obtained after twenty-two minutes of processing.

The above experiments were repeated for a third time, again using de-chlorinated, de-ionized test water and municipal sewage. The test results for the third test using de-chlorinated, de-ionized test water are set out in Table VIII which shows that the ORP has risen to +806 after four minutes. The test procedures for sewage when carried out the third time are set out in Table IX which show that the ORP goes from 28 at the outset for the municipal sewage to a reading of 800 mV after approximately twenty-seven minutes. Further processing for approximately a total time of thirty-five minutes raised the ORP to 810.

TABLE IV

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 48 | | | | | | | |
| | | #584 | 2.750 | A | 0 | 0.00 | 15.5 | 118 |
| 2 | 25 | | | | | | | |
| | | | | | 1 | 0.11 | 15.5 | 185 |
| | | | | | 2 | 1.14 | 15.8 | 383 |
| | | | | | 4 | 1.60 | 16.1 | 910 |

TABLE V

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 48 | | | | | | | |
| | | #584 | 2.750 | P | 0 | 0.00 | 13.5 | 380 |
| 2 | 25 | | | | | | | |
| | | | | | 5 | 0.18 | 14.9 | 525 |
| | | | | | 10 | 0.00 | 15.3 | 782 |
| | | | | | 15 | 0.00 | 16.4 | 811 |
| | | | | | 20 | 0.00 | 17.6 | 826 |
| | | | | | 25 | 0.05 | 18.7 | 841 |
| | | | | | 30 | 0.00 | 19.9 | 852 |
| | | | | | 35 | 0.10 | 21.1 | 865 |
| | | | | | 40 | 0.00 | 22.0 | 873 |

TABLE VI

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 48 | #584 | 2.750 | A | 0 | 0.00 | 20.8 | 100 |
| 2 | 25 | | | | 1 | 0.28 | 21.3 | 125 |
| | | | | | 2 | 0.83 | 21.7 | 218 |
| | | | | | 4 | 1.65 | 22.3 | 600 |

TABLE VII

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 46 | #584 | 2.750 | P | −200 | 0.00 | 16.5 | 0 |
| 2 | 25 | | | | +650 | 0.00 | 24.5 | 22 |

TABLE VIII

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 47 | #584 | 2.750 | A | 0 | 0.00 | 18.8 | 135 |
| 2 | 25 | | | | 1 | 0.05 | 19.4 | 173 |
| | | | | | 2 | 0.30 | 19.9 | 290 |
| | | | | | 4 | 1.22 | 20.4 | 806 |

TABLE IX

| Meter No. | PSI | Injector | Suction (SCFH) | Measurement Point | Time (Mins) | Ozone Residual (mg/L) | Temp ° C. | ORP (mV) |
|---|---|---|---|---|---|---|---|---|
| 1 | 45 | #584 | 2.750 | P | 28 | 0.00 | 14.2 | 0 |
| 2 | 25 | | | | 650 | 0.36 | 18.3 | 7:36 |
| | | | | | 700 | 0.34 | 19.8 | 9:53 |
| | | | | | 750 | 0.27 | 20.2 | 14:14 |
| | | | | | 800 | 0.27 | 22.6 | 27:10 |
| | | | | | 810 | NR | 26.0 | 35:00 |

These Figures and Tables as set out above, illustrate that an appropriate system for monitoring the above-noted process and system can be achieved by monitoring the ORP of the fluid under processing. The above figures, when correlated, establish many things required in the verification process. Accordingly, if any element in the apparatus is not working, for example, the oxygen concentrator, the ozone generator, or the pump, then there will not be the desirable increase in the ORP. With the ORP increasing as indicated above, this provides verification that the components of the system are, in fact, working and that suitable processing is occurring. In addition to monitoring that the system components are working as intended, this also provides a signal, indicative of processing to a given level. Once the processing to the desired level is achieved, then the controller can use that information to operate the discharge valve so as to permit discharge of the fluid from the processing system. Once the batch has been discharged, then a new batch may be introduced into the processing tank and the system begins to operate to process a subsequent batch.

The system, apparatus and processes described herein may be used for treatment of a wide variety of influents and for a wide variety of purposes. Influent streams such as those from a household do not normally contain any chemicals and therefore present an influent solution which is relatively easy to clean up. The system apparatus and processes described herein may provide an alternative to the use of septic tanks and tile bed disposal systems. In one embodiment, for individual household locations remote from city operated sewer systems, the system, apparatus and processes described herein may be used in place of a septic tank. The effluent leaving a private residence may be collected in a tank which essentially forms a buffer/storage tank. The system can then be operated in a batch process to process the sewage where it may be disposed of in a bed. Where, routinely, septic tank systems have only resulted in disinfection to a level of, perhaps, at best, two log disinfection, the present system may achieve a higher level of disinfection, perhaps as much or greater than a four log reduction.

The present system, apparatus and processes may also be used to treat water for irrigation purposes. Again, the influent may be variable with respect to the contents of the influent. When the treated solution is to be used for surface irrigation, then typically, standards set by governmental agencies, for example, the U.S. EPA or Environment Canada must be met. In one embodiment, the system, apparatus and processes of the present invention may achieve a five log disinfection relatively easily when the influent is household sewage.

Degassing/Off-Gassing

Degassing from the wastewater mixture and offgassing from the system are useful to deal with unwanted gases which may be formed in the mixture during treatment. These unwanted gases may restrict the amount of new ozone that can be dissolved in the liquid and are therefore desirably purged. Carbon reacts with ozone to produce carbon dioxide ($CO_2$) however, the pressure must be brought to one atmosphere (1 bar) for it to be released. Ammonia ($NH_3$) on the other hand, reacts very little with ozone below a pH of 10. However at 4 bar, up to eighty percent of any ammonia formed can be released along with any other Nitrogen by purging nitrogen ($N_2$). Offgassing from the system should be done carefully to ensure that some of the liquid is not discharged with the gas. As well, the offgas arrangement desirably delivers the gas to the ground or the system may be fitted with a suitable ozone destruct device if it is being discharged into the atmosphere.

When using the system, apparatus and processes explained above, there is an optional choice as to whether the treated fluid is to be de-neutrified or not. In the case of fluid being used for irrigation, the nitrogen and phosphorus components in the fluid may be used by the plants being irrigated. Where that is the intended use of the system, apparatus and process, there may be no need to attempt to remove nitrogen or phosphorus from the treated effluent. In these cases, then, filtration may be omitted from the disposal line as it is the action of the filter which results in the reduction of phosphorus compounds in the effluent. Similarly, where the nitrogen is a desired component of the effluent, then the step of off-gassing may be omitted.

Alternatively, where processing of household sewage and the like, particularly in remote areas near watersheds, removal of nitrogen and phosphorus from the treated effluent may be desired for maintaining water quality. In these cases, the system, apparatus and process may include either or both of (a) degasification, as explained herein, to promote nitrogen removal from the treated effluent; and (b) filtrations of treated effluent, as described above, to promote removal of phosphorus. As shown by the tables referred to hereinbefore, the system, process and apparatus can provide a significant reduction in nitrogen and phosphorus content in the treated filtered effluent.

All of the tests referred to in the foregoing discussion were performed using a test apparatus in which the amount of fluid in the reactor or batch tank was circulated through the ozone injectors in approximately one and a half minutes. When the system is operated for 30 minutes this involves approximately 20 passes for the batch, on average, through the ozone injectors. The operating time of the system, or perhaps more accurately the number of passes required, may depend on at least two factors. One of these is the quality of the influent, that is how much clean-up is required, and secondly, what is the quality desired of the treated effluent.

In all cases, the ozone input to the fluid and thus the treatment cycle must continue long enough so that the biochemical oxygen demand ($BOD_5$) is satisfied by the ozone and that sufficient additional ozone injection occurs to reach the desired disinfection and/or denutrification level.

Figure 2:
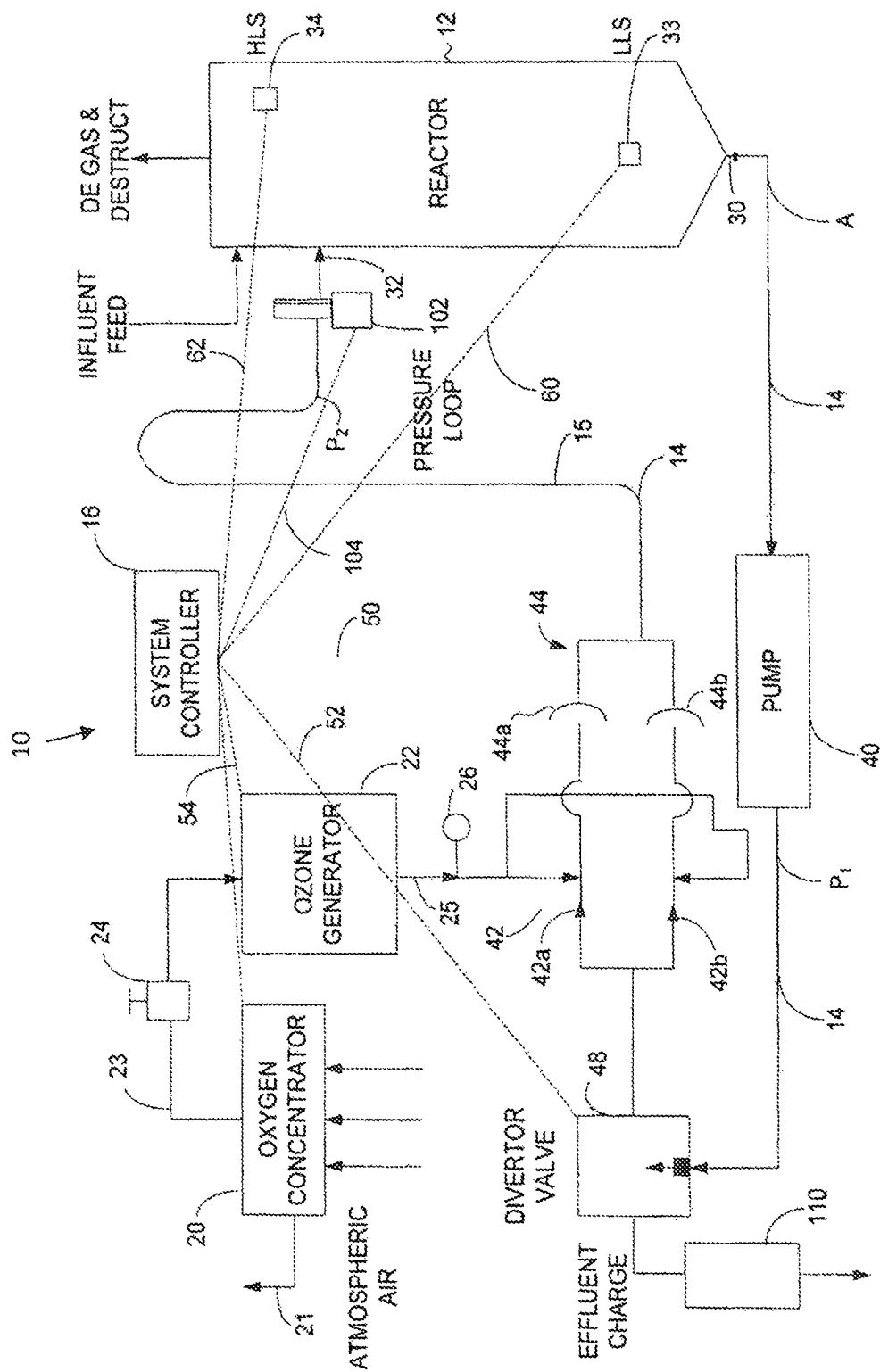
FIG. 2 is a schematic flow chart of an alternative apparatus to that of FIG. 1.
Figure 3:
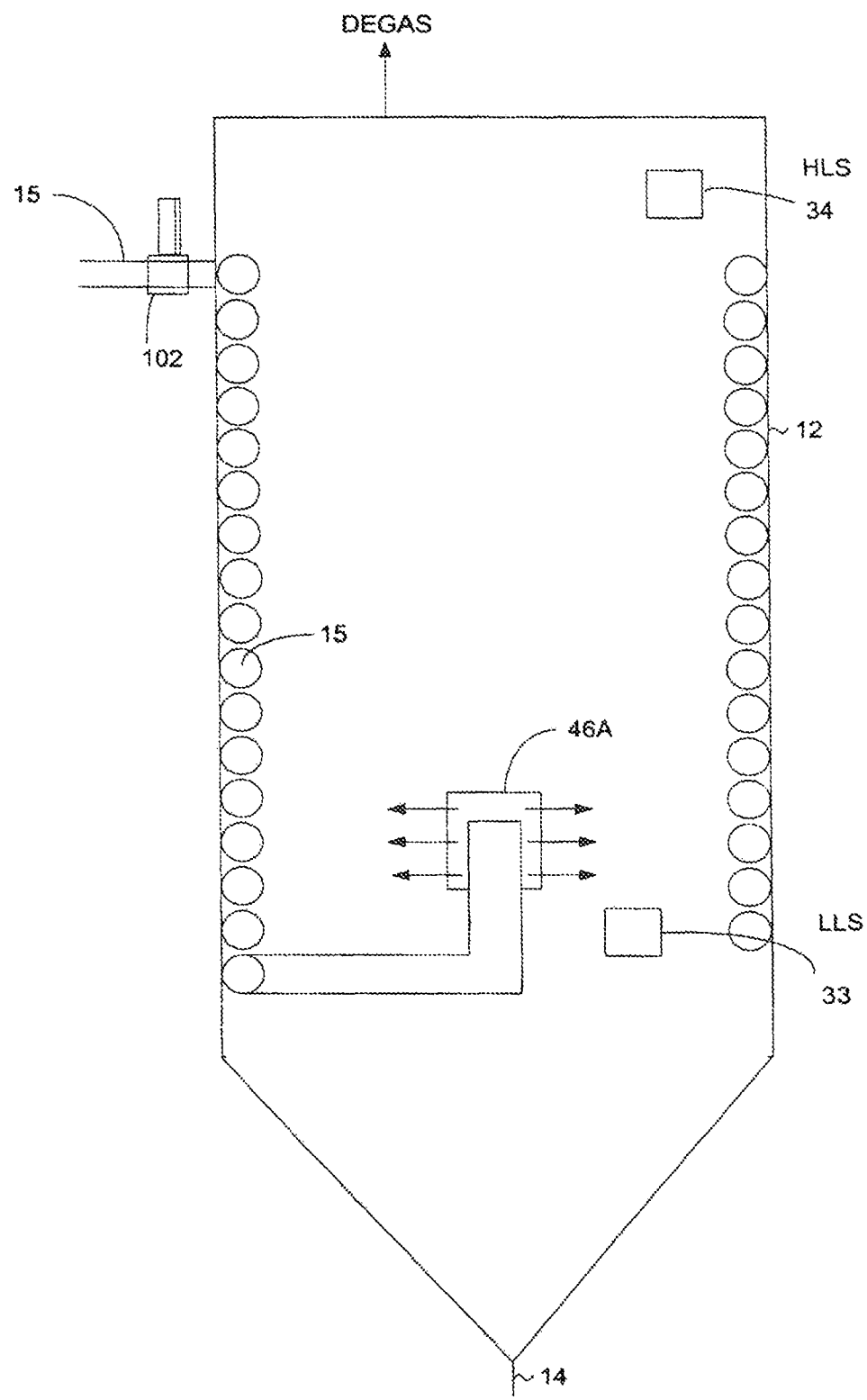
FIG. 3 illustrates a portion of the apparatus of FIGS. 1 and 2 but in accordance with a further embodiment.

As illustrated in both FIGS. 1 and 2, pressure portion 15 of treatment conduit 14 includes a section downstream of the pump and upstream of pressure device 46. As explained above, in the embodiment illustrated in both FIGS. 1 and 2, the pressure device used was a control valve. By manually adjusting that valve, the desired pressure in pressure section 14 was maintained. As explained above, when it was desired to have a longer pressure portion 15, then the length of the tubing forming the pressure portion 15 was increased. It happened to be convenient in the test apparatus being used, that the additional length of pressure loop could be made of a coil placed within reactor 12 as shown in FIG. 3. By placing the additional length within tank 12, pressure valve 46 was eliminated. With the additional length of the pressure section within the reactor, the outlet from pressure portion 15 included a back-pressure-causing orifice member 46A which then functions as a fixed-position restriction replacing pressure device 46. Orifice member 46A is referred to herein as a restrictor/diffuser. That restrictor/diffuser included a fitting have a plurality of orifices. Orifices of different sizes can be used to change the constriction, and therefore the pressure restriction, achieved. The outlet area of the orifices was calculated to restrict the flow in pressure portion 15 to provide the desired back pressure to maintain a pressure upstream of the restrictor/diffuser in excess of one atmosphere and where indicated, up to two atmospheres. Thus, the pressure device 46, instead of being a valve exterior to the treatment tank 12, comprised the back pressure causing restrictor/diffuser 46A. The restrictor/diffuser 46A could be positioned below the operating liquid level as shown in FIG. 3 or above the operating liquid level as shown in FIG. 4.

Figure 4:
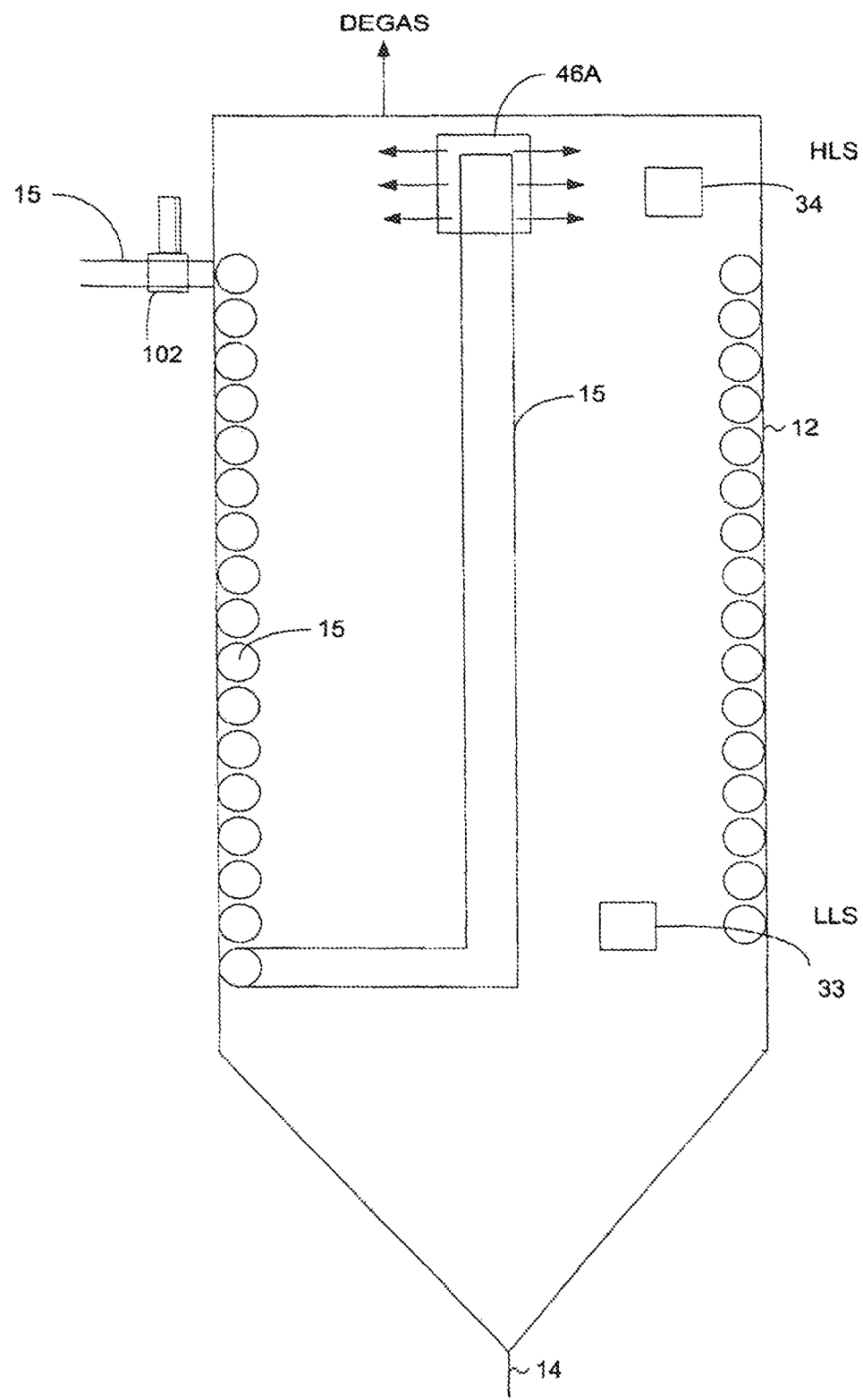
FIG. 4 is a view similar to FIG. 3 illustrating a further alternative embodiment.

It appears that a greater release of off-gases occurs when the restrictor/diffuser is located above the operating liquid level within tank 12 (as shown in FIG. 4). The restrictor/diffuser when located above the liquid seems to promote degasification of the treated fluid leaving the pressure section. Disinfection seems to be more readily obtainable with the restrictor/diffuser above the operating liquid level (FIG. 4). However, testing also seems to show increased levels of denutrification are achieved with the restrictor/diffuser below the operating liquid level (FIG. 3).

In FIG. 1 the ORP sensor is located immediately adjacent the outlet of the tank. As stated above, this provides a sensing of the treated fluid at what is likely to be its worst condition. This location is also helpful when the system, apparatus and process of this invention is being utilizing primarily for denitrification purposes. In FIG. 2, the ORP sensor is located within the recirculation conduit, pressure section, downstream from the ozone injectors but upstream of the pressure device. Advantageously this should be as close to the pressure device as is convenient. The reason for this location is that where off-gassing occurs, several gases will be given off during the off-gassing. There may be gasses formed in recirculation conduit 14 as a result of the ozone therein. Thus, during off-gassing, particularly where the pressure device is located above the fluid level in treatment tank 12 it may be that ozone will be off-gassed as well as other gases. As an ORP sensor senses the level of disinfection component within a fluid, then locating the sensor as shown in FIG. 1, may give an unacceptably low reading and may not be satisfactorily indicative of the state of the fluid itself. Accordingly, when disinfection is the more important objective, the sensor may be located upstream of the pressure device, within the recirculation conduit and the restrictor/diffuser may be located above the liquid level of the tank.

Figure 6:
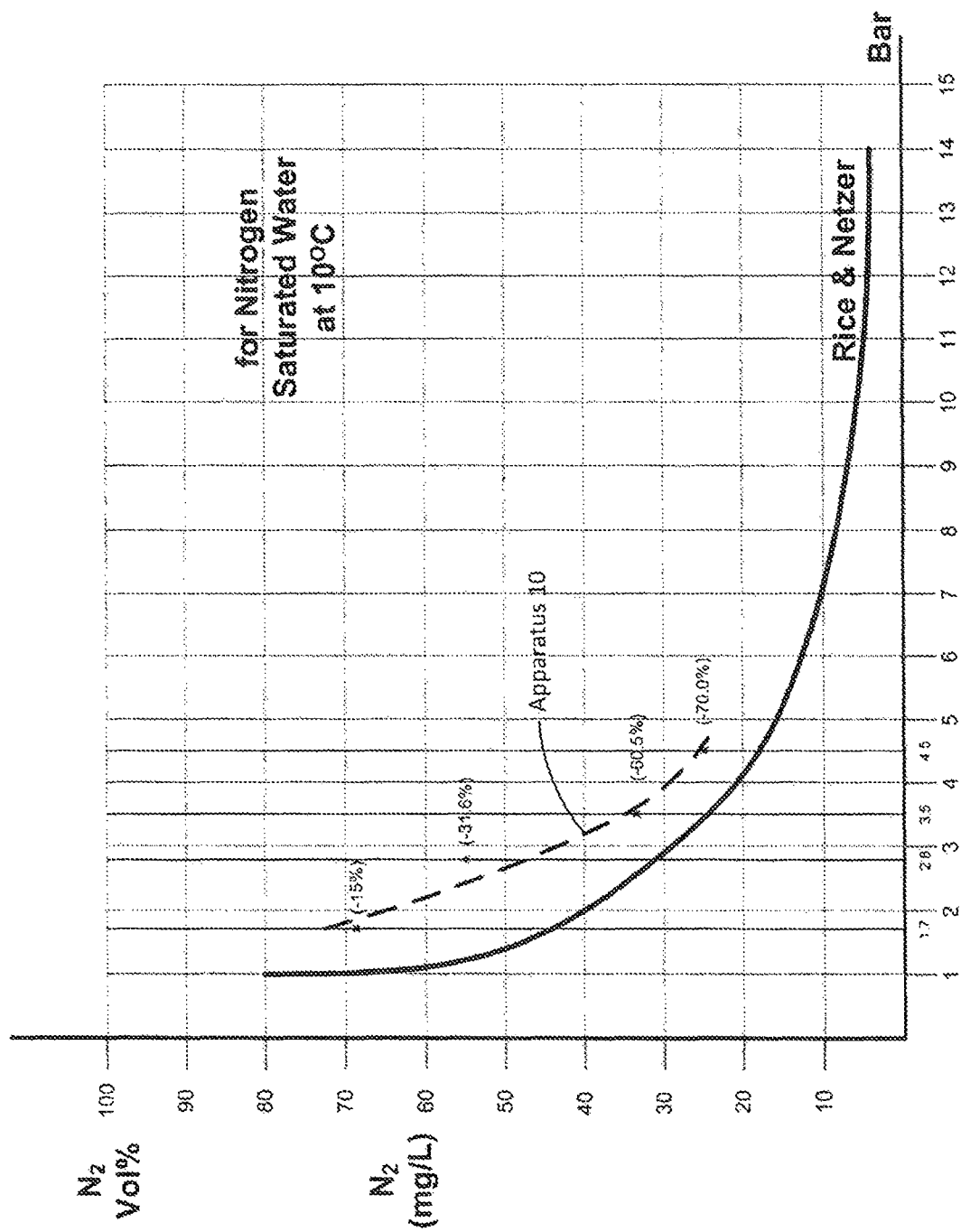
FIG. 6 shows a graph correlating dissolved nitrogen with pressure.

Curve (1), being the solid line curve of FIG. 6 shows the decreasing percentage of the volume of N2 in nitrogen—saturated water at 10° C. with increasing pressure. (Rice and Netzer, 2000)(5). Curve (2), namely the dotted line of FIG. 6 shows the percentage reduction of ammonia by the release of nitrogen gas from wastewater in treatment system 10. Although the curves are different, they are similar.

Oxidation Reduction Potential—Monitoring & Discharge Control

Oxidation Reduction Potential (ORP) is used to monitor the process and may be monitored to facilitate discharge when a desired treatment level is achieved. Every water-based liquid has a unique ORP voltage that can be used to assess its state with respect to disinfection and denutrification. Table X presents some typical ORP voltages for general reference.

TABLE X

TYPICAL ORP VOLTAGES

| Wastewater/Water | | ORP (mV) |
|---|---|---|
| Septage | low in pathogens high in nutrients | −300 to −100 |
| Sewage | high in pathogens low in nutrients | 100 to 300 |
| World Health Organization (WHO) | standards for disinfection | 650* |
| Disinfection | >6 LOG with 95% confidence | 800* |
| Denutrification | CBOD5 <10 mg/L with 95% confidence | 900* |
| Deionized Dechlorinated Test Water | | >1000* |

NOTE
*with ozonation

Figure 7:
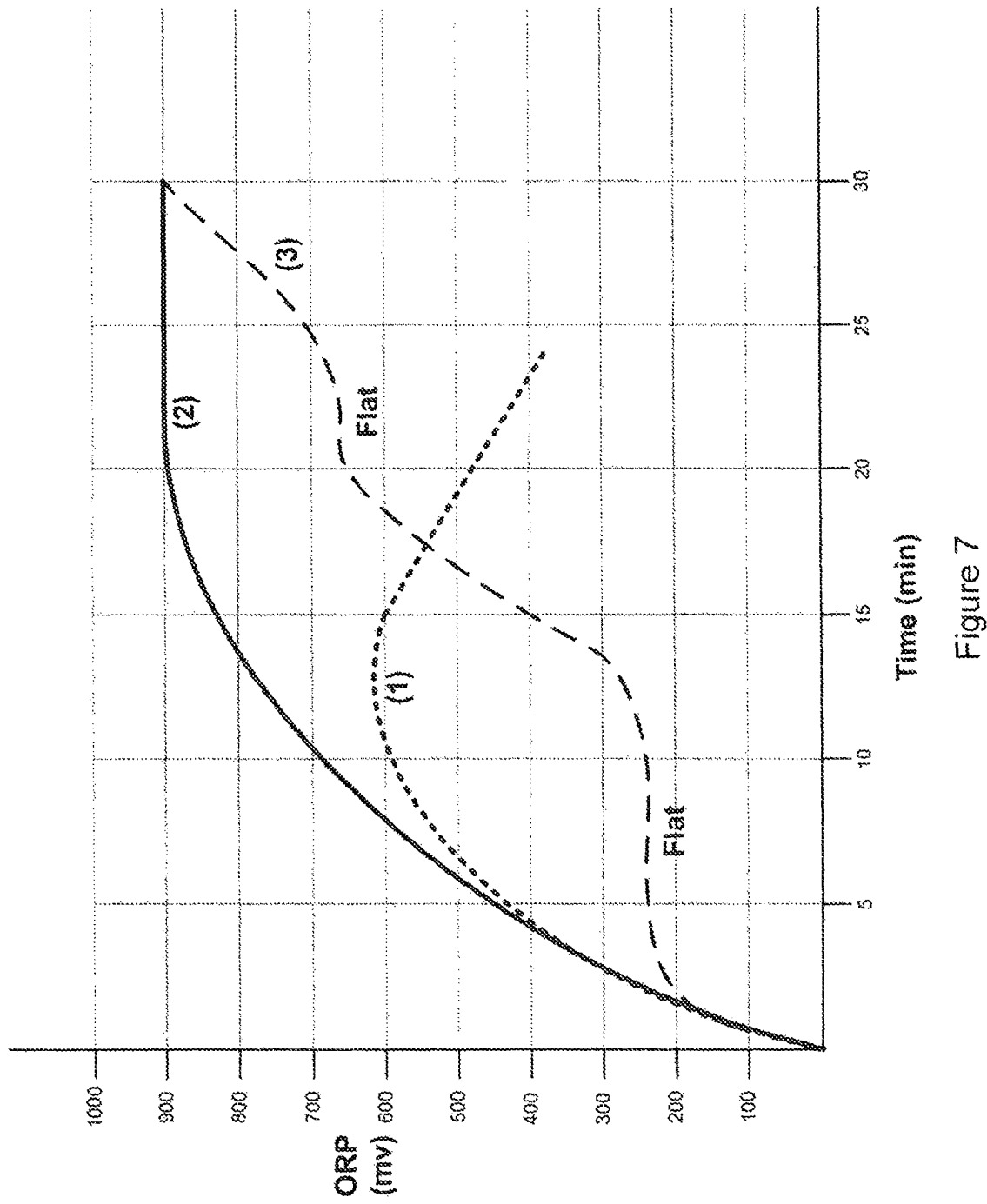
FIG. 7 shows a graph of oxidation reduction potential as a function of time for different processes.

ORP is very useful in the monitoring of the process. FIG. 7 presents some typical ORP curves. Curve (1) of FIG. 7 depicts the change in ORP over thirty minutes, during treatment of wastewater sewage in the system represented by apparatus 10, without degassing of the wastewater sewage. In this instance ozone was injected, consumed, and unwanted gases were created in the wastewater sewage. Although additional ozone was continuously injected no further treatment could be achieved. This is shown by the lack of increase in ORP after 10-15 minutes. The ORP rises for the first 10-15 minutes but then begins to fall off and the process does not continue to what might have been a higher desired treatment level.

Curve (2) of FIG. 7 depicts the change in ORP over thirty minutes with degassing of the wastewater sewage. In this instance ozone was continuously injected, consumed, unwanted gases were degassed from the wastewater sewage and additional ozone continuously injected. ORP continues to rise until a discharge target of 900 mV is achieved.

Curve (3) of FIG. 7 also depicts the change in ORP over thirty minutes with degassing, of a different wastewater example. In this instance the wastewater is septage and not sewage. Septage has nutrient concentrations (carbon, nitrogen, and phosphorus) about five times that of sewage. It is speculated that the flat spots on the curve are a result of ozone being consumed rapidly during the oxidation of these nutrients and for other chemistry.

Filtration

In some embodiments, the apparatus shown and described herein may include a filter, such as indicated by filter 110. It may be understood that filter 110 is intended generically to represent apparatus for conducting the post-processing (or further processing) step, or steps, of filtration, as may be. In that sense filter 110 may represent a plurality of filters, filtering stations, or steps, and may include filters or filter elements in parallel or in series, or both. Filtration may be used upon discharge from the system at the finale of the process, as indicate by the location of Filter 110. The ozonation process may include partial oxidation, complete oxidation, and sometimes mineralization. One of the major advantages of partial oxidation of organic materials present in wastewater, is that in becoming partially oxidized, the organic materials become much more polar than they were originally. Groupings such as carbonyl (—C=O), carboxyl (—COOH), and hydroxyl (—OH) are formed in the carbonaceous structures by oxidation. As well, the ozonation process produces anions of nitrogen and phosphorus. (Hitzfeld et al., 2000)(6). In the presence of polyvalent cations also present in wastewater, these polar groupings combine to produce organic/inorganic complexed compounds which become insoluble and can be readily removed by filtration. (Harrison et al., 2004)(7). These are known as mircroflocs which are capable of being filtered out using a 25/1 micron-gradient filter. The microflocs which accumulate on the filter are white, odourless, and have been completely disinfected. The filters last for about three months for the average residence, after which they need to be removed, dried, and cleaned for reuse, or replaced.

Time Delayed Filtration

Formation of microflocs may tend to be a time-dependent process. As indicated, the various embodiments of treatment systems described herein may employ batch processing. In a batch process there is a cycle time, or period, defined between the time at which discharged of batch n occurs, and the time at which discharge of batch (n+1) occurs. This time period, namely $t_{(n+1)}-t_n$, may be termed the processing time (PT). There is also the consideration of the filtration time (FT). By subtracting the filtration time (FT) from the processing time (PT), we can determine the retention time (RT). Retention time is the period of time in which the discharge can be retained to allow the formation of microflocs prior to filtration. In addition, it may be that an extra time period is allowed, which may be tern a safety factor, or confidence factor. That safety factor may be perhaps two (2) minutes. The result is as follows:

RT=PT−(FT+2)

RT=PT−(FT+2)=24−(2+2)=20 min time delay            Example:

To that end, prior to filtration, treated outflow from reactor 12 may be retained, either in reactor 12 itself, or in a holding tank 108 (as in FIG. 5a or 5c) temporarily. During the holding time no further ozone is being added to the system, and the fluid in reactor 12 (or holding tank 108), remains there rather than being circulated through piping 14 and mixing set 44. Microflocs may form during the holding time, and, as suspended or precipitated solids, may be later removed.

Combination Filtration

Filtration may be capable of dealing with both suspended particulate (microflocs) and dissolved (in solution) elements. In the embodiments described herein, there may be a combination of conventional filtration and adsorption filtration. For example, the suspended particulates may be filtered using the 25:1 micron conventional polypropylene filter referred to above. The dissolved, in solution, elements may be filtered using powder activated carbon (AC). The conventional, mechanical, filtration is followed by the adsorption filtration. In combination, the conventional, upstream mechanical, filter may tend to protects the adsorption filter from plugging.

Overlapping Batch Processing/Back to Back Operation

Dilution is the most basic form of wastewater treatment. In some embodiments, a system such as that of apparatus 10 may take advantage of dilution by implementing overlapping batch processing. For example, the treatment tank of reactor 12 may be of a suitable size to hold a volume of 3× of fluid, or such that the combined volume of reactor 12, the various lengths of piping of conduits 14 and mixer set 44 is 3×. A desired batch size may be 2× by volume. In one process, at the end of each treatment cycle, the step of treating with ozone may be followed by the step of discharge of treated fluid. However that discharge of fluid may be to the extent of 2× volume of fluid rather than the entire 3× capacity held in the treatment system 10.

When the outflow valve is closed, such as when the liquid level falls to a point sufficient to activate the low level sensor 33, and after any dwell time as may be, the inflow is opened, a replacement volume of 2× may be added, raising the volume to the level of high level sensor 34. Thus the newly added 2× will mix with the existing 1× of treated fluid, giving a total of 3×. There is an overlap between subsequent batches of (1× Remainder/2× New)=50%.

At the end of treatment cycle and just before discharge, the processed liquid (now effluent) in the amount of 3× may have an ORP value of between 800-900 mV. When an amount is retained, such as amount 1×, and is not discharged, that amount 1× remains to mix with the incoming influent 2× to be treated. This dilutes the incoming 2× batch and also allows treatment of the influent to begin during the fill cycle. During filling, liquid in reactor 12 is not being pumped through the recirculation pump and no ozone is being injected into the contents of reactor 12 as it is being filled. The effect of this dilution and mixing is displayed on the ORP readout wherein during the fill cycle the ORP drops from 900 mV to 100 mV, whereas the incoming influent had an ORP of −300 mV.

The decay rate of ozone in water at 1 bar is about 15 minutes. The ORP reading of untreated water which is not polluted is generally about +300. The effluent which showed an ORP reading of approximately +900 millivolts immediately at the end of treatment will eventually degrade to a reading of approximately +300 as the ozone decays. In a closed pressure environment, it may be somewhat longer. Mixing the 1× residue, freshly treated, with the incoming 2×, in a back-to-back manner, before the high ORP decays may tend to obtain some benefit of that high ORP as the two constituents, or streams, mix.

The 2:1 ratio, yielding 50% overlap between batches as described above, may be varied depending on the circumstances. In one example, where system volume is 60 liters, process time may be about 30 minutes (20 cycles at 1 cycle every 90 seconds) with 40 liters being discharged and 20 liters being retained, giving the proportions and ratios described above. In another example, system volume may be 52 liters, processing time may be 24 minutes (18 cycles), 32 liters may be discharged, and 20 liters may be retained, i.e., 8/13 is discharged, 5/13 is retained, and the overlap is therefore 20/52=5/13. In another example processing time may be 15 minutes (15 cycles), system volume may be 40 liters, 20 liters may be discharged and 20 liters may be retained, giving a 100% overlap. As can be seen, the ratios may be lesser, such as 5:2; 3:1 or 4:1, or may be greater, be it 5:3; 3:2; 5:4; or 1:1; or it may be in some permutation of these ranges between 1:1 and 4:1.

Generally, the embodiments described herein may be operated for continuous batches in one session per day. The processing session may usually occur at night when power rates are lower and temperatures are cooler. The system may operate with an initial charge, which may be followed by repeated back to back cycles, one after another, until the incoming wastewater, accumulated in an upstream pumping chamber, septic bed, septic tank, or other reservoir, is processed down to some predetermined lower quantity in the pumping chamber.

Figure 8:
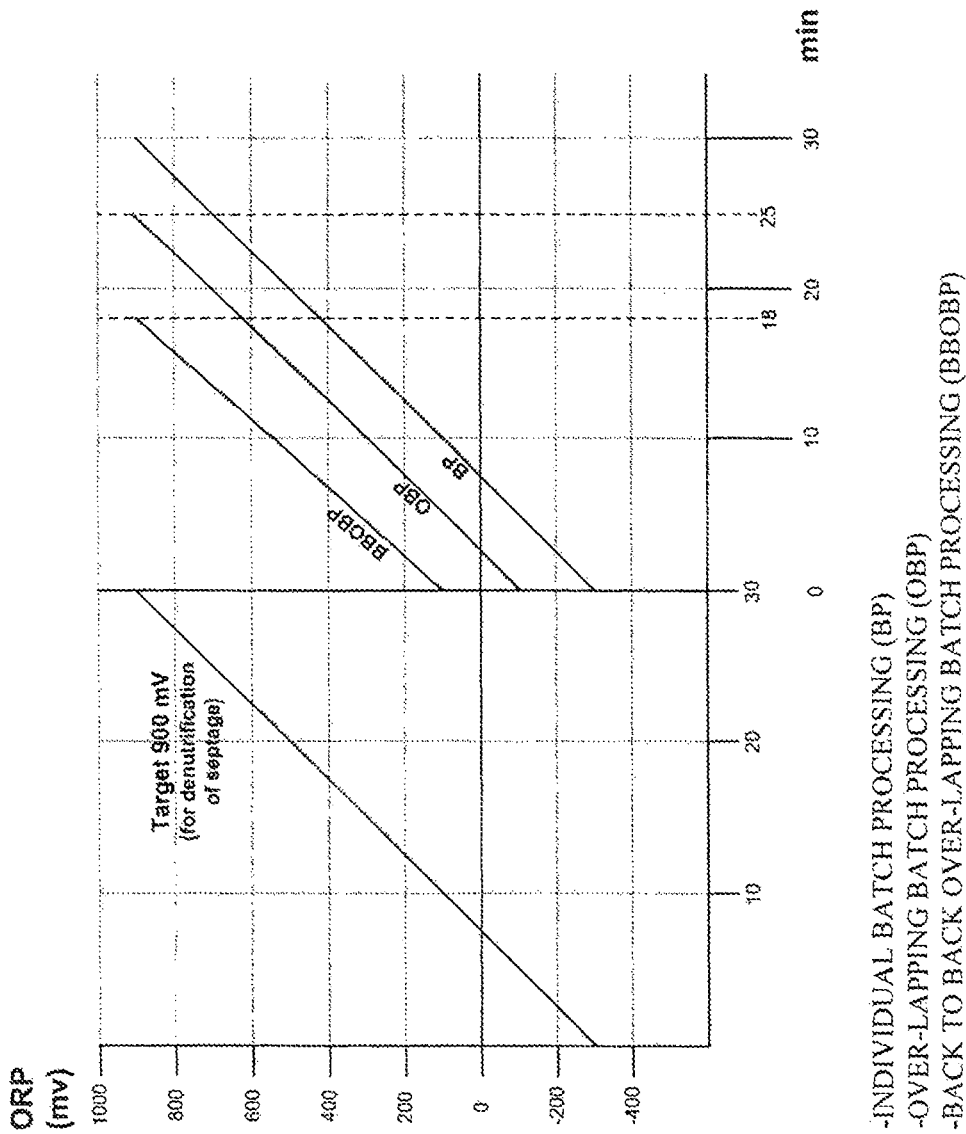
FIG. 8 shows a graph of oxidation reduction potential as a function of time for different methods of processing.

The plots shown in the Figures and Tables herein are representative only. While the plots are shown as straight lines illustrating the increase in ORP with time, the actual increase in ORP is a curve as shown in FIG. 8. At the left side there is an ORP/time plot for a single batch. At the right side 3 plots are shown. The BP plot is the same as the left side. The OBP plot shows the result when treating a batch of 2× (e.g., 40 liters) when retaining a quantity of 1× (e.g., 20 litres) of the previous batch but the second batch is not back to back, that is, it is processed more than 15 minutes after completion of the first batch. The new batch of 60 liters includes a batch of 1× which having an ORP of approximately +300. The incoming batch of 2× quantity may have a starting reading of −300 as shown with the BP curve. The average ORP based on 2× of −300 and 1× of +300 thus gives an average starting ORP of −100. When the overlapping batch is treated, starting at an ORP reading of −100, it will reach the desired reading of approximately +900 in approximately 25 minutes as shown by the illustrative curve labelled OBP. As shown by this curve and as shown by Table XI, continuing to operate continuously on this basis for overlapping batch processing results in processing 40 liters of sewage every 25 minutes. This provides an average processing rate for processing the 40 liter batch of 1.6 liters per minute. Accordingly, in order to achieve 60 liters processed, the total time would be 25 minutes times 1.5 which is 37.5 minutes. Thus, processing non-back to back, overlapping batches of 40 liters or 2× is counterproductive as compared to processing 60 liters all in one batch.

If however the batch processing is done in a back-to-back, overlapping system, then significant advantage is achieved. The curve shown in FIG. 8 and in Table XI is achieved for back to back processing where there is approximately one to two minutes (or perhaps less) between the completion of a batch and the commencement of processing of a subsequent batch. During that two minute period or less, 40 liters of the treated batch is disposed of and 40 liters of new influent is added into the treatment chamber. The same conditions apply, that is, 1× of 20 liters is retained and 40 liters is discharged. Because the ozone has not decayed in the short period of less than two minutes, the fluid within the treatment chamber comprises a batch of 1× having an ORP reading of close to +900 and a quantity of 2× having a starting reading of approximately −300. This then gives an average starting rate of +100 for the combined batch of 3×. Upon treatment of that batch of 60 liters, the target ORP reading of +900 is achieved in 18 minutes. Again with respect to Table IV, it will be noted that 40 liters have been processed for disposal, in a time of 18 minutes, giving an average processing rate of 2.2 liters/minute. This means that to treat 60 liters using this back to back, overlapping batch processing would require 18×1.5 which equals 27 minutes. Thus, in a continuing series of back to back overlapping batch processing, the time to process 60 liters on average, has dropped from 30 minutes to 27 minutes. In the embodiment of processing in which a portion of the previously treated high ORP batch is retained in reactor 12, and a new batch is added and mixed therewith, this may occur while the existing retained portion has an ORP of more than 450 mV, and, in another embodiment, where the ORP is above 600 mV. In general, a short delay such that the ORP has not decayed is may be helpful for this mixing purpose.

Expressed differently, if the total quantity to be treated were 600 liters, then in non-overlapping, non-back to back as in curve BP, the equipment would run 30×(600/60)=300 minutes.

If the same total quantity is processed in back to back, overlapping as in curve BBOBP the equipment would run 18×(600/40)=270 minutes.

This represents a saving of 30 minutes run time with the associating energy cost saving as well.

This illustrates the advantage of back to back, overlapping processing as opposed to non-back to back, overlapping processing and as opposed to non-overlapping processing. It is believed that this beneficial effect can be achieved as long as the back to back, overlapping processing is done in less than 15 minutes, and preferably is done as quickly as possible in the time frame required to discharge the desired amount and fill the processing chamber with an amount equal to the amount discharged.

TABLE XI

PROCESSING RATES

| MODE | LITRES PROCESSED | TIME (MIN) | LITRES PER MIN |
|---|---|---|---|
| BP | 60 | 30 | 2.0 |
| OBP | 40 | 25 | 1.6 |
| BBOBP | 40 | 18 | 2.2 |

Figure 5A:
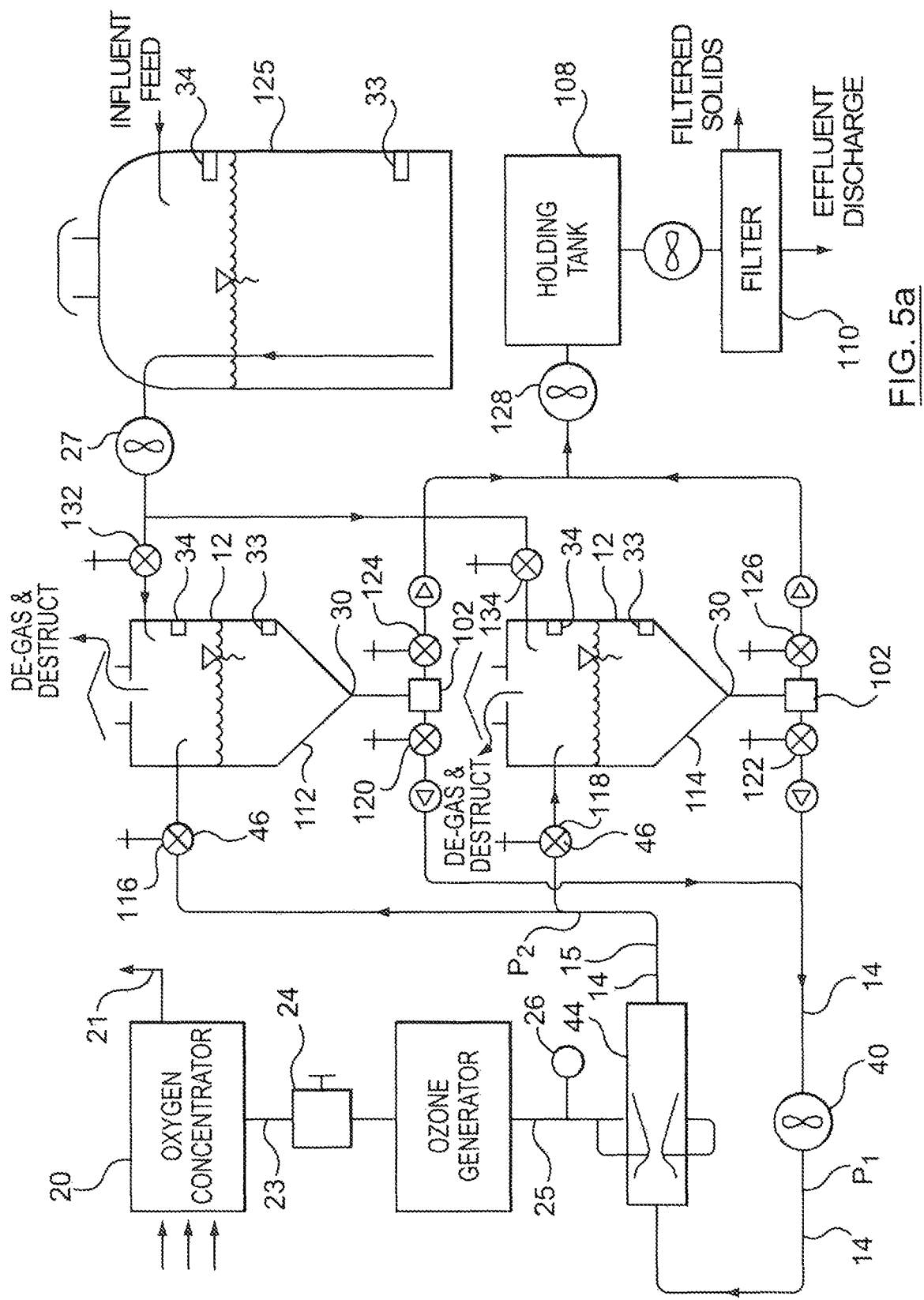
FIG. 5a shows a further alternate embodiment to the apparatus of FIG. 1.

The alternate embodiment of FIG. 5a illustrates a treatments system substantially similar to that of FIG. 1, with like elements numbered consistently. The embodiment of FIG. 5a differs from the embodiment of FIG. 1 in that the embodiment of FIG. 5a incorporates two reaction chambers 12, identified as 112 and 114 respectively, those reaction chambers being operated alternately according to the cyclic schedule shown schematically in FIG. 5c. A single mixing set 44 is used alternately to inject ozone and treat flowable material first of one reactor 12, and then, when complete, to process flowable material from the other reactor.

Starting with first reactor 112, processing occurs as described above in respect of treatment system 10. After the processing cycle is complete, and confirmed as such by appropriate readings from sensor 102, valve 116 leading from mixing set 44 to first reactor 112 is closed, and valve 118 leading from mixing set 44 to second reactor 114 is opened. It is assumed that reactor 114 is waiting, containing a full charge of flowable material to be treated. The outflow valve 120 of first reactor 112 is also closed, and the outflow valve 122 of second reactor 114 is opened. The discharge valve 124 of first reactor 112 is opened, and the discharge valve 126 of second reactor 114 is closed. From this state the electronic controller 16 causes pump 40 to draw flowable material from second reactor 114, and it is processed as previously described.

In the meantime, while the flowable material from second reactor 114 is being processed, a first portion of the treated material from first reactor 112 is discharged toward filter 110, either under the influence of gravity, if appropriate, or with the aid of a discharge pump 128, as may be.

In one embodiment there is a holding tank 108 mounted upstream of filter 110. The treated effluent from first reactor 112 may be retained in holding tank 108 for a period of time to give a longer opportunity for microflocculates to form. This occurs without the addition of fresh ozone such as would occur is the effluent had continued to be circulated through mixing set 44.

After such holding period as there may have been, the effluent in holding tank 130 is directed to filter 110, as described above, in which there may be mechanical filtration of floculants, and chemical filtering as may be appropriate.

When this is complete, holding tank 108 may once again stands empty. Alternatively, holding tank 108 may be large enough to accommodate a following charge of treated effluent as filtering is occurring.

After the first portion of effluent has been directed to filter 110, or to holding tank 108, as may be, discharge pump 128 is shut off, and discharge valve 124 of reactor 112 is closed. At this point first reactor 112 retains the second portion, or balance, of the previously treated, high ORP material, and is ready to be re-filled with a new batch or portion of flowable material to be treated. First reactor inflow valve 132 is then opened (second reactor inflow valve 134 being closed) and new influent feed is directed into first reactor 112, with the aid of a sump pump, such as pump 27, if necessary or desired. Filling first reactor 112 may occur without delay such that the new charge of material may mix with the remaining portion of treated material before the high ORP of the treated material decays, thus gaining the benefit of pre-mixing with the high ORP material prior to the commencement of processing.

When the batch in second reactor 114 is done, the process is repeated, the valve positions being reset to permit discharge of the first portion of the treated materials from reactor 114 toward filter 110 or holding tank 130 if present. That portion of treated material is then retained and filtered in the same manner previously described in respect of the discharge portion from first reactor 112. As this occurs, the new batch in first reactor 112 is being treated.

Thus the use of two reactor chambers permits substantially continuous treatment of the influent feed to occur, with fluid from first the one reactor, 112, and then the other reactor 114 being treated in alternating fashion. Where use, the time of retention in the holding tank 108 may correspond to the time of treatment in the reactor vessel, less the required pump-out time of the discharge, and less such dwell time as may be required by the physical elements of the system.

In an alternative system, holding tank 108 may be omitted, and each of the reactor vessels 112 and 114 used alternately as a holding or retention tank after processing in place of holding tank 108. Prior to the other reactor vessel being finished processing, discharge of the first portion of material from the reactor being used as a retaining tank occurs, that first portion being directed to filter 110. Once the discharge is complete, the waiting reactor receives a top-up fill of new material to be treated. When the other reactor is finished, the various valves are move to permit treatment of the waiting material, and the freshly finished treated material is retained in turn to permit floculates to grow in the retention time period prior to discharge to filter 110. No ozone is added to the contents of the waiting reactor during the retention period.

Figure 5B:
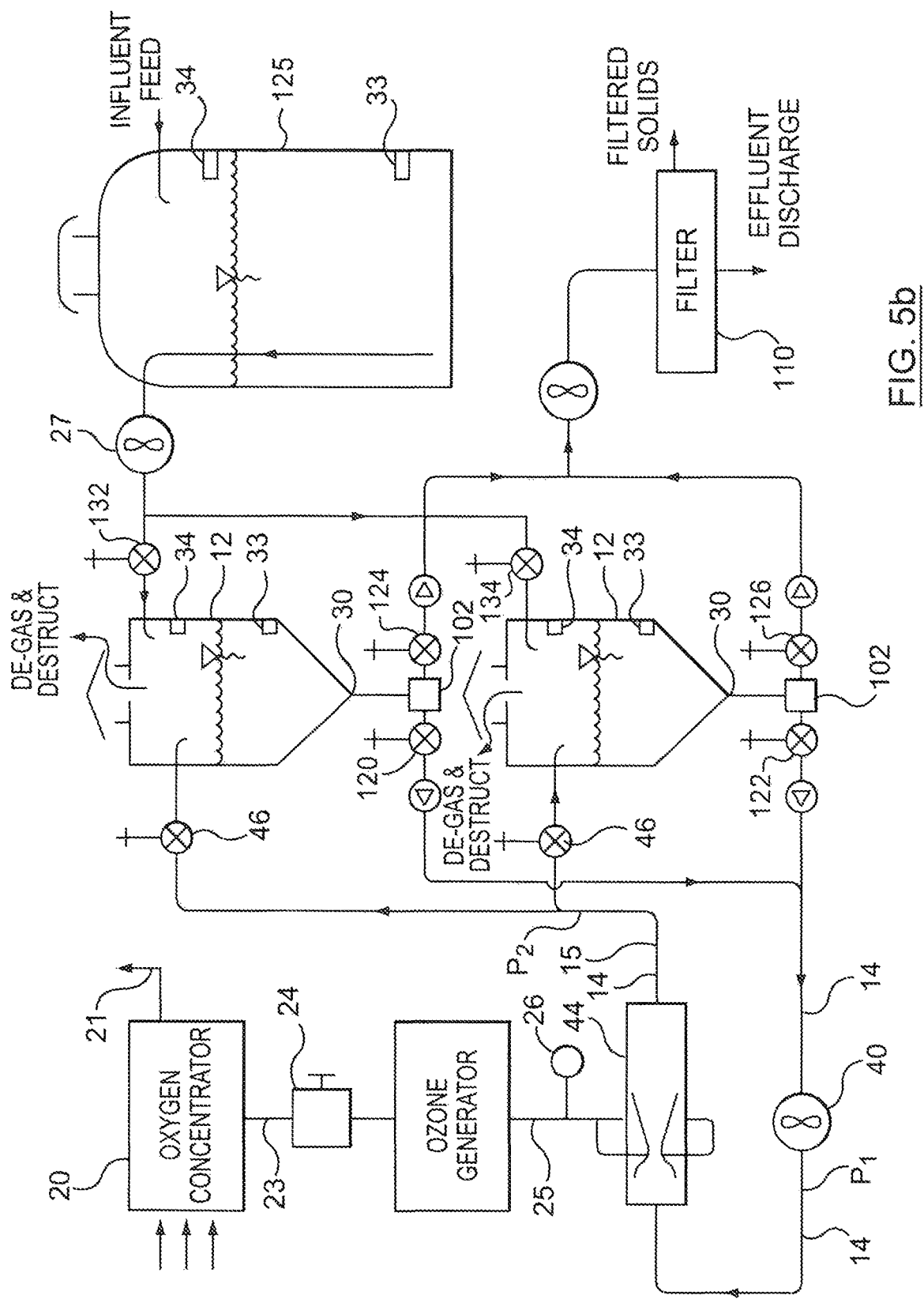
Figure 5C:
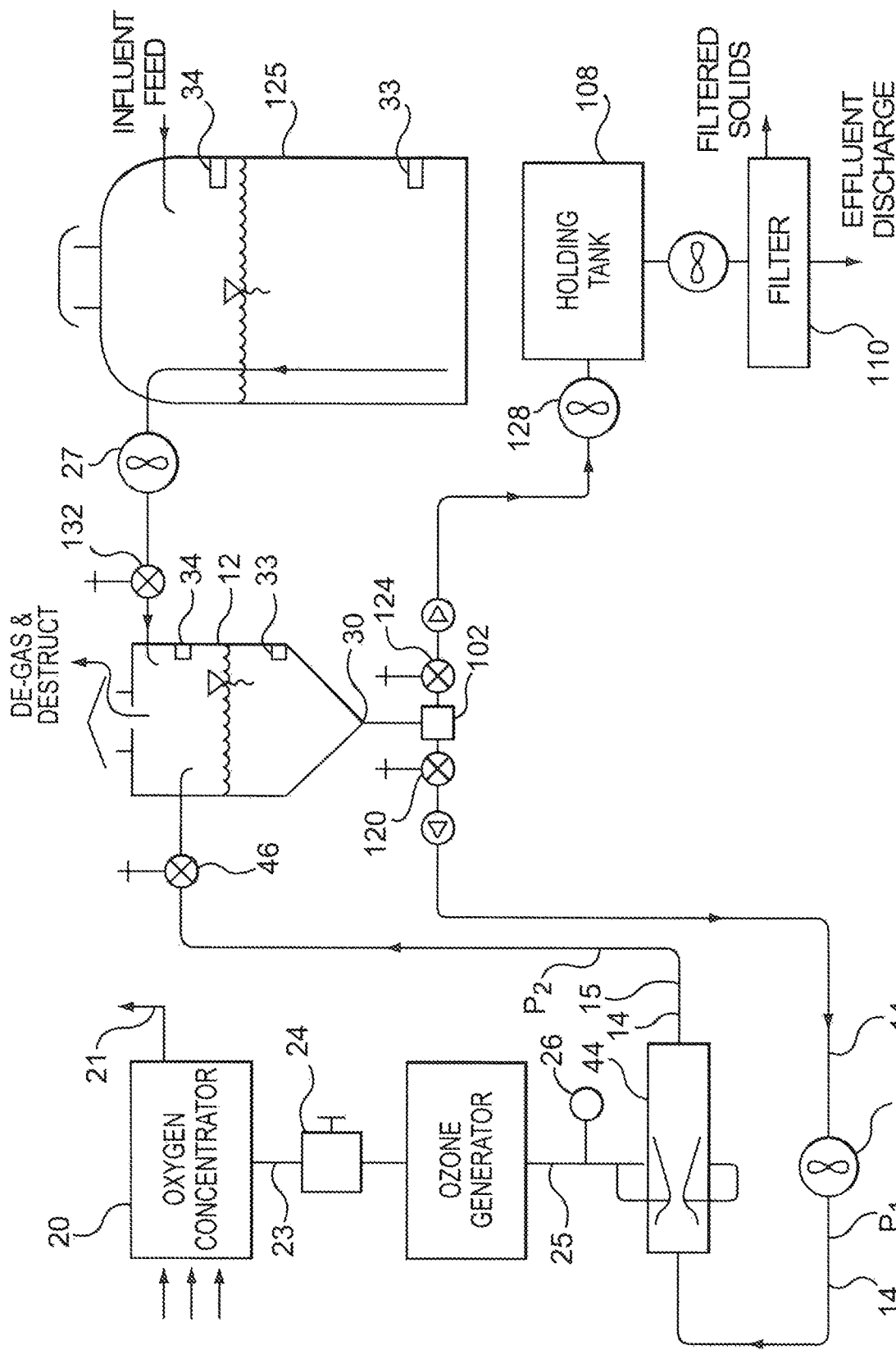
Figure 5D:
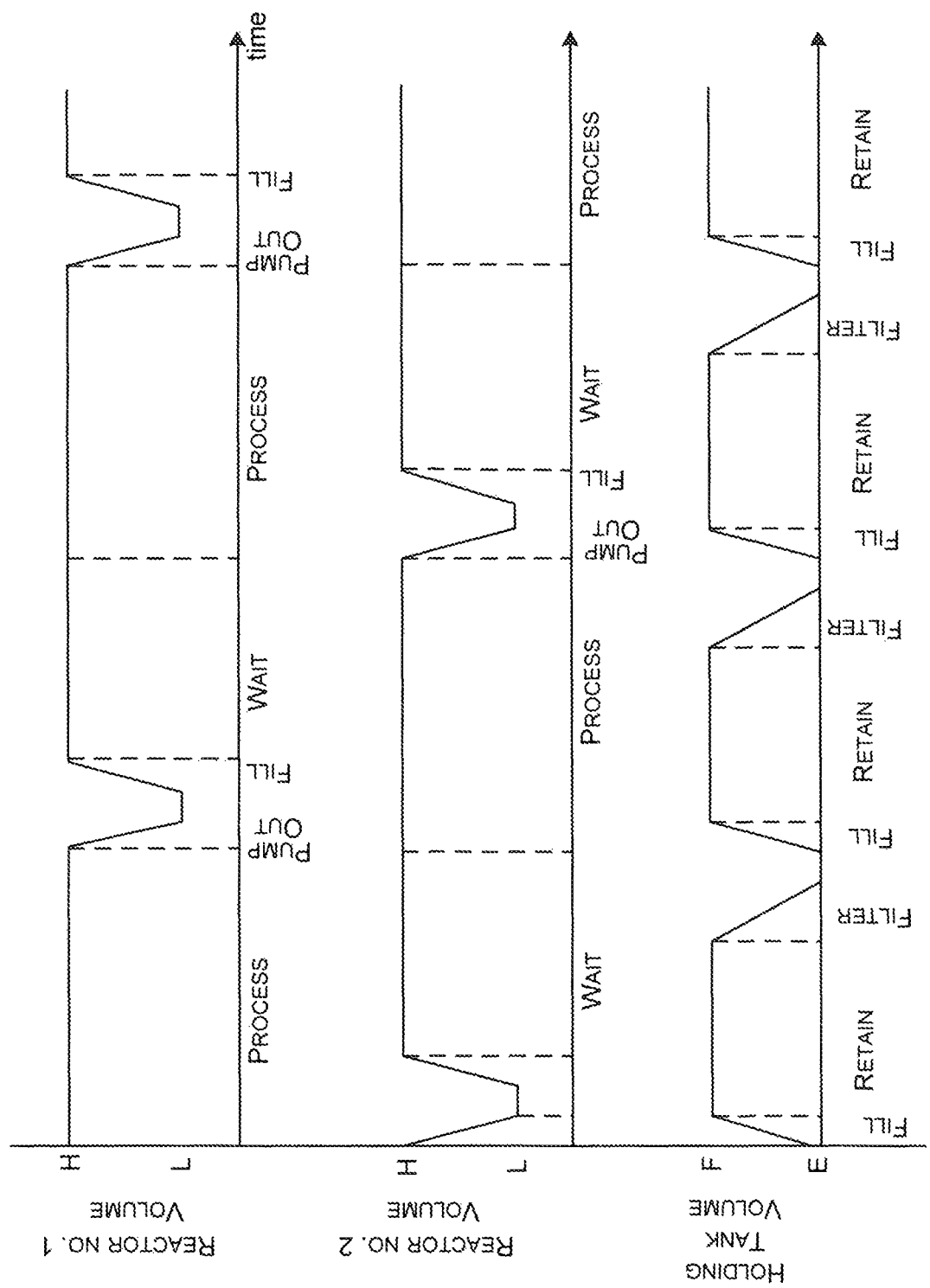
Figure 5E:
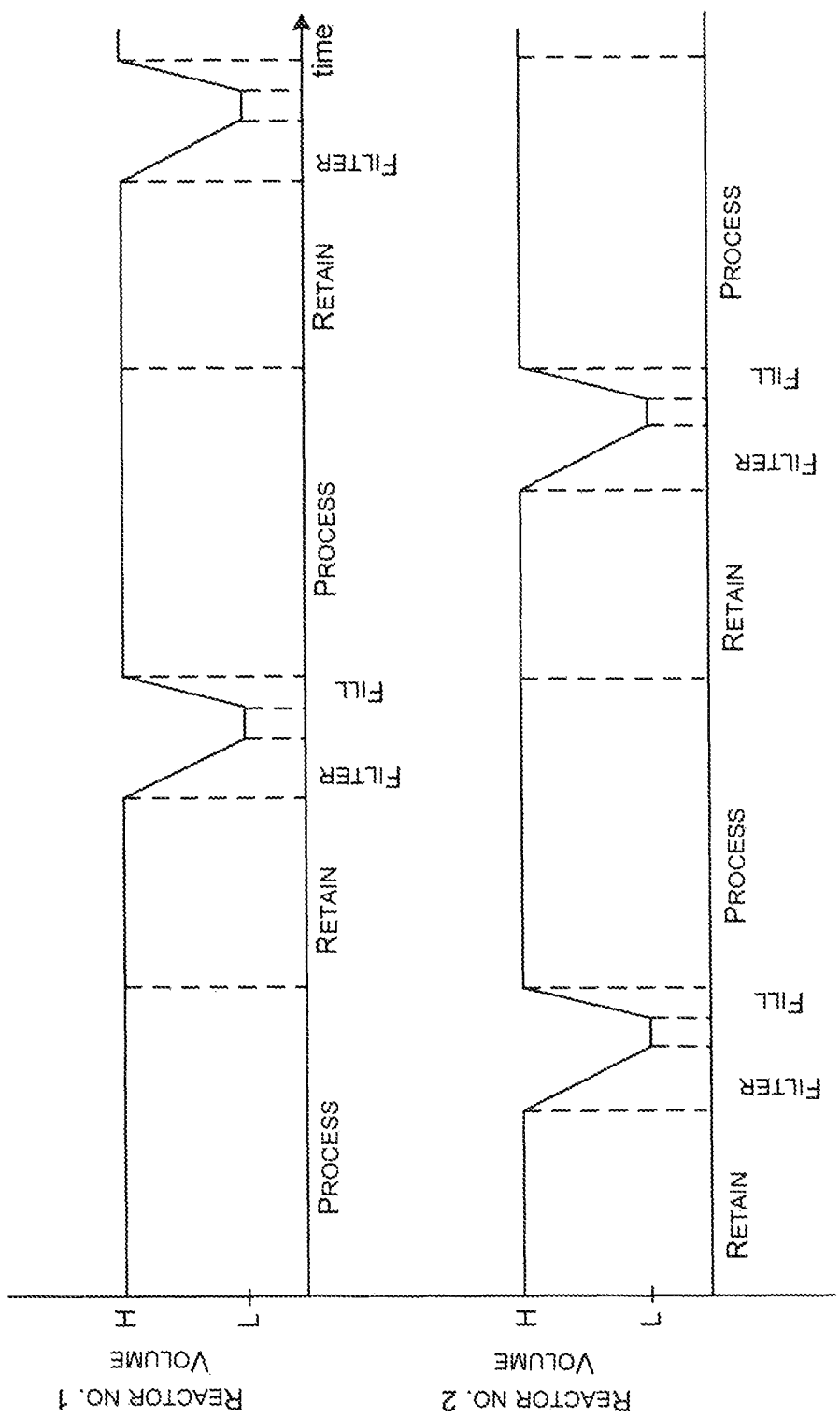
FIG. 5e shows a duty cycle representation of the treatment system of FIG. 5b.
Figure 5F:
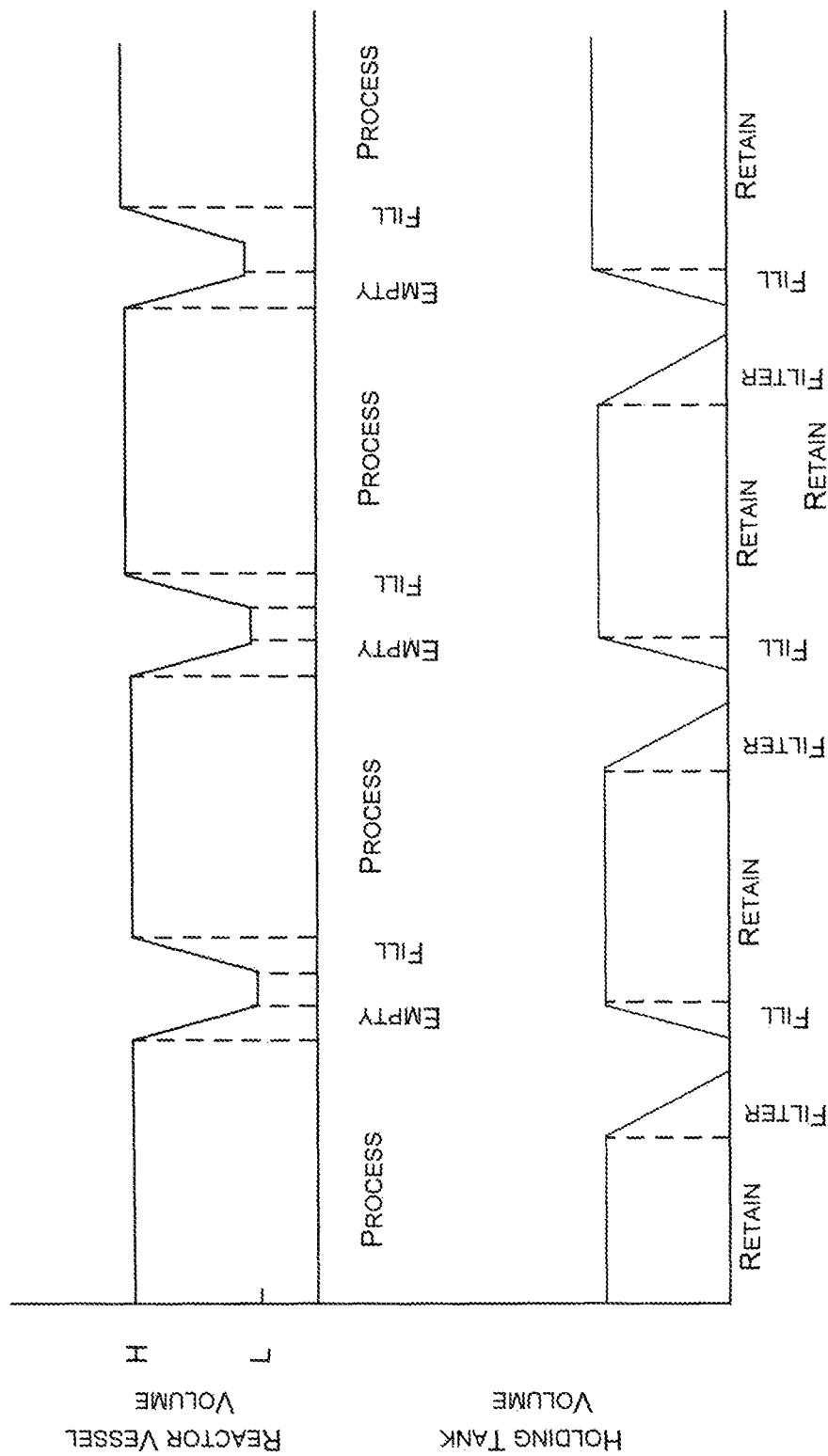
FIG. 5f shows a duty cycle representation of the treatment system of FIG. 5c.

In the further alternative embodiment of FIG. 5b, there is one reactor 12, as in FIG. 1, and, in addition, there is a holding or retention tank, 108 as described above. In this embodiment, when processing of a batch of fluid material in reactor 12 is complete, the first portion is directed to holding tank 108. Once it has been pumped out of reactor 12, the discharge valve of reactor 12 closes. Reactor 12 is them topped-up with additional new material to be treated, and treatment with ozone in mixing chamber 44 occurs as described.

While that treatment is occurring, the material in holding tank 108 is being retained to permit a longer time period for growth of floculates, as discussed above. Prior to completion of treatment of the next batch in reactor 12, the material in holding tank 108 is directed to filter 110, thus emptying the volume of holding tank 108 sufficiently far to accommodate another discharge of treated material from reactor 12. When processing in reactor 12 is complete, the next treated charge portion is directed to holding tank 108; reactor 12 is re-filled, and the process repeats. This may continue until the source of flowable material 25 is emptied.

National Sanitation Foundation (NSF) Requirements

NSF/ANSI 40 considers 5 day biochemical oxygen demand (BOD5), nonnitrogeneous carbonaceous 5 day biochemical oxygen demand (CBOD5), and total suspended solids (TSS). The thirty day average concentration for influent shall be between 100 mg/L and 300 mg/L for BOD5 and between 100 mg/L and 350 mg/L for TSS. Based upon these criteria, performance of one embodiment was:

TABLE XII

| Parameter | BOD5 (mg/L) | CBOD5 (mg/L) | TSS (mg/L) |
| --- | --- | --- | --- |
| Influent | 154 | | 171 |
| Effluent | | 19.8 | 4.6 |

Environmental Technology Verification Canada (ETV) Requirements

ETV considered BOD5, CBOD5, and TSS along with total phosphorus (TP), and *Escherichia coli* (*E. coli*). While no concentrations for influent are mandated, the results for effluent shall be, with ninety-five percent confidence, based upon a statistically significant number of tests—in this case 40.

TABLE XIII

| Parameter | | BOD5 (mg/L) | CBOD5 (mg/L) | TSS (mg/L) | TP (mg/L) | *E. Coli* (cfu) |
| --- | --- | --- | --- | --- | --- | --- |
| Influent | high | 1,060 | | 1,645 | 23.8 | 6,900,000 |
| | median | 83 | | 106 | 1.65 | N/A |
| | average | 154 | | 171 | 2.93 | N/A |
| | geomean | N/A | | N/A | N/A | 788,714 |
| | low | 18 | | 28 | 1.14 | 33,000 |
| Effluent | high | | 25 | 7 | 1.88 | 2 |
| | median | | 21 | 4.5 | 1.35 | N/A |
| | average | | 19.8 | 4.6 | 1.36 | N/A |
| | geomean | | N/A | N/A | N/A | <2 |
| | low | | <4 | 2 | 0.88 | 0 |
| | 95% confidence | | 25 | 7 | 1.75 | <2 |

The example system was operated at a hydraulic capacity of 1,920 L/day in a pH range of 7.02-7.27, a temperature range of 7.2-10.5 degrees Celsius, and an average processing time for the wastewater sewage of 30 minutes.

Although the embodiments illustrated and described above are preferred, the principles of the present invention are not limited to this specific examples or details which are given by way of illustration herein. It will be understood that permutations and combinations of the features of the embodiments described above may be made, without exhaustive description herein of all possible combinations of features that can be made. It is possible to make other embodiments that employ the principles herein and that fall within the following claims.

The invention claimed is:

1. An apparatus for treating aqueous solutions for disposal, said apparatus comprising:
   (a) a processing tank, the tank having a fluid outlet and a fluid inlet;
   (b) a recirculation conduit, the recirculation conduit being fluidly connected to the fluid inlet and the fluid outlet; the recirculation conduit including,
      (i) a pump for recirculating fluid from the processing tank, through the recirculation conduit and back into the tank in a flow direction;
      (ii) at least one ozone injector for injecting ozone into fluid being circulated by the pump, the ozone injector being downstream of the pump,
      (iii) a pressure device, said pressure device being located within the recirculation conduit and downstream of the ozone injector, wherein, in operation, said pressure device is operable to maintain a pressure in a portion of the recirculation conduit between the pump and the pressure device at a pressure above atmospheric;
      (iv) a mixer, the mixer being located downstream of the ozone injector and upstream of the pressure device;
      (v) an oxidation/reduction potential (ORP) sensor operable to measure an ORP of the fluid in the recirculation conduit; and
      (vi) a diverter valve switchable between a recirculation configuration in which the diverter valve passes fluid for recirculation through the recirculation conduit, and a diverting configuration in which the diverter valve diverts fluid from the recirculation conduit for discharge;
   said apparatus being operable to continue processing of the fluid until the ORP of the processed fluid at said sensor rises to a predetermined level.

2. The apparatus of claim 1 wherein the pressure device dish comprises a flow restrictor.

3. The apparatus of claim 1 further comprising a discharge conduit, said discharge conduit including a filter.

4. The apparatus of claim 1, further comprising a controller in communication with the diverter valve, the controller configured to switch the diverter valve from the recirculation configuration to the diverting configuration based at least on the ORP of the processed fluid at the sensor having risen to the predetermined level.

5. The apparatus of claim 4, wherein the predetermined level is at least +650 mV.

6. The apparatus of claim 4, wherein the predetermined level of ORP is at least +675 mV.

7. The apparatus of claim 4, wherein the predetermined level of ORP is at least +800 mV.

8. The apparatus of claim 1 wherein said pressure device includes any one of (a) a flow constriction; (b) a valve; and (c) a restrictor orifice.

9. The apparatus of claim 1 further comprising an oxygen concentrator connected to an ozone generator through an oxygen conduit, the oxygen conduit having an oxygen flow control valve, and said apparatus is operable to control the flow of oxygen to said ozone generator.

10. The apparatus of claim 1 wherein the pump is a constant displacement pump and the pressure device is one of (a) a restrictor/diffuser; and (b) a restrictor valve.

11. The apparatus of claim 1 wherein said sensor is located in said recirculation conduit downstream of said ozone injector and upstream of said pressure device.

12. A process for treating aqueous solution for disposal using the apparatus of claim 1, the process comprising continuously recirculating an influent of aqueous solution through the recirculation conduit, and continuously injecting ozone into the aqueous solution as the aqueous solution circulates through the ozone injector.

13. The process of claim 12 wherein during cycling through said recirculation conduit said aqueous solution is maintained at a pressure of at least 2.0 atmospheres for at least 2 seconds.

14. The process of claim 12 wherein the process further includes filtering treated aqueous solution prior to disposal.

15. The process of claim 12 wherein the influent comprises a nitrogen content prior to treatment and the process further comprises off gassing nitrogen gasses as said mixture of ozone and solution recirculates.

16. The process of claim 15 wherein the aqueous solution has an operating liquid level within the tank, and said process includes releasing treated aqueous solution back into the tank from the pressure device above the operating liquid level.

17. The process of claim 12 wherein the influent has a phosphorus content prior to treatment.

18. The process of claim 12 wherein the aqueous solution has an operating liquid level within the tank, and said process includes releasing treated aqueous solution back into the tank from the pressure device above the operating liquid level.

19. The process of claim 12 including ending said process once the ORP of the processed fluid has reached the predetermined level and diverting the processed fluid from the recirculation conduit.

20. The process of claim 19 wherein the predetermined level is at least 650 mV.

21. The process of claim 19 wherein the predetermined level is at least 800 mV.

22. The apparatus of claim 1, wherein the diverter valve is downstream of the pump and upstream of the ozone injector.

23. The apparatus of claim 1, wherein the recirculation conduit is configured to conduct substantially all fluid withdrawn from the fluid outlet to the fluid inlet during recirculation.

24. The apparatus of claim 1, wherein the portion of the recirculation conduit has a length selected to provide a residence time of fluid in the portion of the recirculation conduit of at least 10 seconds during recirculation.

25. The apparatus of claim 1, wherein the portion of the recirculation conduit has a cross-section and a length, the cross-section and length selected so that at a flow rate of 50 liters per minute, residence time of the fluid in the portion of the recirculation conduit is at least 10 seconds during recirculation.

26. The apparatus of claim 1, wherein the portion of the recirculation conduit has a length of at least 17 meters.

27. An apparatus for treating aqueous solutions for disposal, comprising:
(a) a processing tank for receiving an aqueous solution to be treated, the tank having a tank inlet and a tank outlet;
(b) a recirculation conduit extending from the tank outlet to the tank inlet, the recirculation conduit comprising:
 (i) at least one valve switchable between a recirculation configuration in which the tank outlet is in fluid communication with the tank inlet via the recirculation conduit, and a discharge configuration in which the tank outlet is in fluid communication with a discharge outlet;
 (ii) a pump for pumping the aqueous solution from the tank outlet to the tank inlet via the recirculation conduit when the at least one valve is in the recirculation configuration;
 (iii) at least one ozone injector downstream of the pump for injecting ozone into the aqueous solution pumped through the recirculation conduit;
 (iv) a back-pressure device downstream of the ozone injector and upstream of the tank inlet for maintaining elevated pressure in a pressure portion of the recirculation conduit between the ozone injector and the back-pressure device; and
 (v) a sensor operable to measure an oxidation/reduction potential (ORP) of fluid in the recirculation conduit; and
(c) a controller in communication with the sensor and the at least one valve, the controller configured to continuously recirculate the aqueous solution through the recirculation conduit for treatment by maintaining the at least one valve in the recirculation configuration until the sensor indicates a target ORP level has been reached, and upon reaching the target ORP level, the controller configured to switch the at least one valve from the recirculation configuration to the discharge configuration for discharging treated aqueous solution from the apparatus.

28. The apparatus of claim 27, wherein the tank outlet is isolated from the discharge outlet when the at least one valve is in the recirculation configuration.

29. The apparatus of claim 28, wherein the at least one valve comprises a diverter valve downstream of the pump, the diverter valve having a valve inlet port in fluid communication with the pump, a first valve outlet port in communication with the ozone injector and a second valve outlet port in fluid communication with the discharge outlet, wherein the valve inlet port is in fluid communication with the first valve outlet port when the at least one valve is in the recirculation configuration.

30. The apparatus of claim 27, wherein the pressure portion of the recirculation conduit has a length of at least about 17 meters to facilitate a residence time of about 10 seconds for the aqueous solution when travelling from the ozone injector to the back-pressure device.

* * * * *

UNITED STATES PATENT AND TRADEMARK OFFICE
CERTIFICATE OF CORRECTION

PATENT NO. : 10,710,914 B2  
APPLICATION NO. : 15/640078  
DATED : July 14, 2020  
INVENTOR(S) : Thomas W. Bain et al.

Page 1 of 1

It is certified that error appears in the above-identified patent and that said Letters Patent is hereby corrected as shown below:

On the Title Page

At Item (72) Inventors:, "David Fancher, Dayton, OH (US)" should read -- David Fancher, Dublin, OH (US) --.

Signed and Sealed this  
Tenth Day of November, 2020

Andrei Iancu  
*Director of the United States Patent and Trademark Office*